(12) United States Patent
Hovland et al.

(10) Patent No.: US 12,458,866 B2
(45) Date of Patent: *Nov. 4, 2025

(54) ATHLETIC TIMING DEVICE

(71) Applicants: Peter N. Hovland, Leonard, MI (US); Paul David Huch, Rochester, MI (US)

(72) Inventors: Peter N. Hovland, Leonard, MI (US); Paul David Huch, Rochester, MI (US)

( * ) Notice: Subject to any disclaimer, the term of this patent is extended or adjusted under 35 U.S.C. 154(b) by 934 days.

This patent is subject to a terminal disclaimer.

(21) Appl. No.: 17/527,782

(22) Filed: Nov. 16, 2021

(65) Prior Publication Data

US 2022/0072404 A1 Mar. 10, 2022

Related U.S. Application Data

(63) Continuation-in-part of application No. 17/362,328, filed on Jun. 29, 2021, now Pat. No. 12,268,933, and a continuation-in-part of application No. 15/945,986, filed on Apr. 5, 2018, now Pat. No. 11,179,621.

(60) Provisional application No. 63/046,450, filed on Jun. 30, 2020.

(51) Int. Cl.
*A63B 71/06* (2006.01)
*A63B 69/12* (2006.01)

(52) U.S. Cl.
CPC .......... *A63B 71/0686* (2013.01); *A63B 69/12* (2013.01); *A63B 71/0622* (2013.01); *A63B 2071/0625* (2013.01); *A63B 2220/62* (2013.01); *A63B 2225/60* (2013.01)

(58) Field of Classification Search
CPC ............................... G04F 10/00; A63B 69/12
See application file for complete search history.

(56) References Cited

U.S. PATENT DOCUMENTS

| | | | |
|---|---|---|---|
| 5,349,569 A | 9/1994 | Tanaka | |
| 5,391,080 A | 2/1995 | Bernacki | |
| 5,713,792 A | 2/1998 | Ohzono | |
| 5,813,945 A | 9/1998 | Bernacki | |
| 5,938,565 A | 8/1999 | Bernacki | |
| 10,765,900 B2 | 9/2020 | Lacey | |
| 11,235,193 B1* | 2/2022 | McConachie | A63B 21/4009 |
| 2010/0197467 A1 | 8/2010 | Hector | |
| 2010/0233664 A1 | 9/2010 | Wroclawsky | |
| 2013/0267384 A1 | 10/2013 | Eldridge | |
| 2014/0038777 A1 | 2/2014 | Bird | |
| 2014/0097285 A1 | 4/2014 | Chang | |
| 2015/0290517 A1 | 10/2015 | Saleh | |
| 2016/0016046 A1* | 1/2016 | Reese | A63B 35/00 482/55 |

(Continued)

*Primary Examiner* — Edwin A. Leon
*Assistant Examiner* — Jason M Collins
(74) *Attorney, Agent, or Firm* — Dority & Manning, P.A.

(57) ABSTRACT

A timing device includes a housing defining an aperture. An elongated member is extendable from the housing through the aperture. A reel assembly includes a spool rotatable about a spool axle. A portion of the elongated member is wound about the spool. An encoder assembly includes a first wheel and an encoder operably coupled with the first wheel. The encoder is configured to detect a rotational velocity of the first wheel. A controller is configured to calculate a linear velocity of the elongated member based on the rotational velocity of the first wheel. The elongated member is configured to move with the swimmer as the swimmer moves away from the housing.

20 Claims, 27 Drawing Sheets

(56) References Cited

U.S. PATENT DOCUMENTS

2016/0121194 A1   5/2016   Chuang
2018/0243599 A1   8/2018   Lacey

* cited by examiner

ATHLETIC TIMING DEVICE

CROSS-REFERENCE TO RELATED APPLICATIONS

This application is a continuation-in-part application claiming the benefit of priority to U.S. Non-Provisional application Ser. No. 15/945,986, filed Apr. 5, 2018, and U.S. Non-Provisional application Ser. No. 17/362,328, filed Jun. 29, 2021, which claims benefit to U.S. Provisional Application No. 63/046,450, filed Jun. 30, 2020, all of which are hereby incorporated by reference in their entirety.

FIELD OF THE INVENTION

The present disclosure generally relates to timing devices, and more particularly, to athletic timing devices.

BACKGROUND OF THE INVENTION

Timing devices are commonly utilized in training and competitions in various athletic events. In some instances, it may be desirable to have a more accurate timing device.

BRIEF DESCRIPTION

Aspects and advantages of the present disclosure will be set forth in part in the following description, or may be obvious from the description, or may be learned through practice of the present disclosure.

According to some aspects of the present disclosure, a timing device for swimming includes a housing defining an aperture. An elongated member is extendable from the housing through the aperture. A reel assembly includes a spool rotatable about a spool axle. A portion of the elongated member is wound about the spool. An encoder assembly includes a first wheel and an encoder operably coupled with the first wheel. The encoder is configured to detect a rotational velocity of the first wheel. A controller is configured to calculate a linear velocity of the elongated member based on the rotational velocity of the first wheel. The elongated member is configured to move with a swimmer as the swimmer moves away from the housing.

According to some aspects of the present disclosure, a method of operating a timing device for swimming includes performing a calibration routine to determine an initial distance that an elongated member extends from a housing. The method also includes performing a first timing sequence during which the elongated member is extended from the initial distance to a predefined distance from the housing.

According to some aspects of the present disclosure, a timing device includes a housing defining a compartment. A reel assembly is configured to operably couple with an elongated member. An encoder assembly includes a first wheel, a second wheel, and an encoder operably coupled with at least one of the first wheel or the second wheel. The first wheel rotates in a first direction and the second wheel rotates in a second direction.

These and other features, aspects, and advantages of the present technology will become better understood with reference to the following description and appended claims. The accompanying drawings, which are incorporated in and constitute a part of this specification, illustrate examples of the disclosure and, together with the description, serve to explain the principles of the present disclosure.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
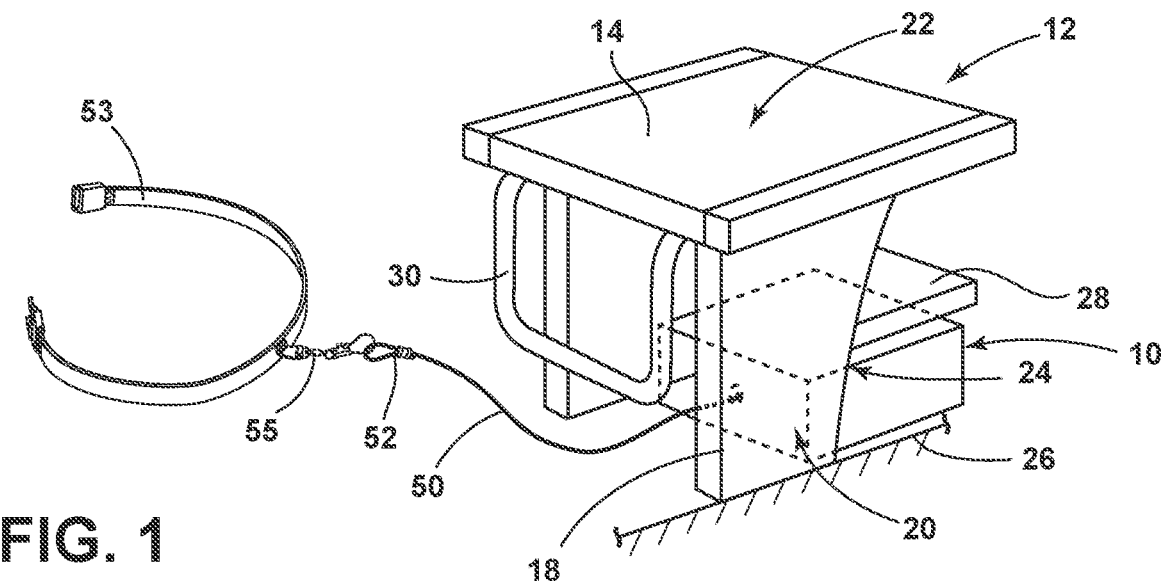
FIG. 1 is a rear perspective view of a swimming starting block and timing device attached thereto, according to some examples.

Repeat use of reference characters in the present specification and drawings is intended to represent the same or analogous features or elements of the present technology.

DETAILED DESCRIPTION

For purposes of description herein, the terms "upper," "lower," "right,". "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a timing device. The timing device utilizes an elongated member and may employ a device for calculating the velocity at which the elongated member is extended from the timing device. The timing device may be manufactured at low costs when compared to timing devices currently available. Moreover, the timing device may update an instantaneous velocity of the user at more frequent rates than currently available timing devices.

Figure 2:
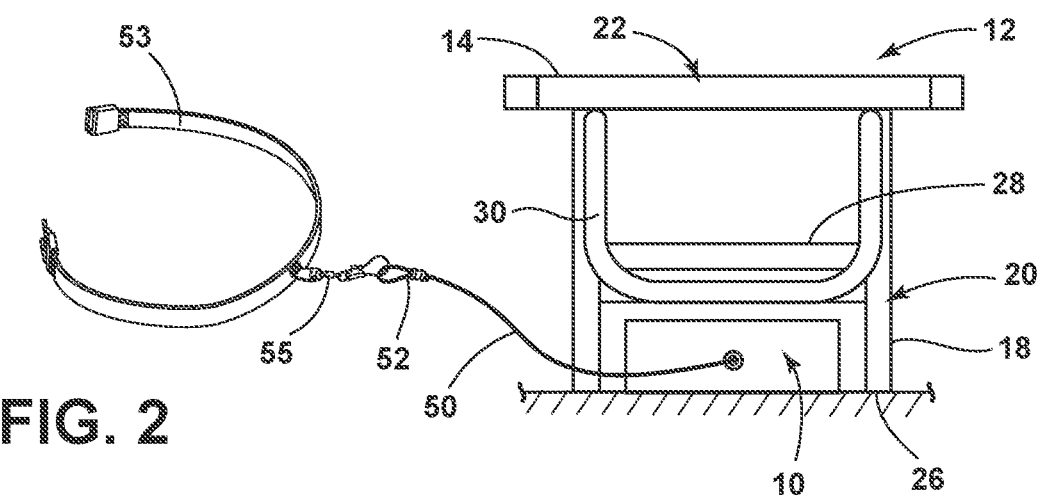
FIG. 2 is a front plan view of the starting block and timing device, according to some examples.
Figure 3:
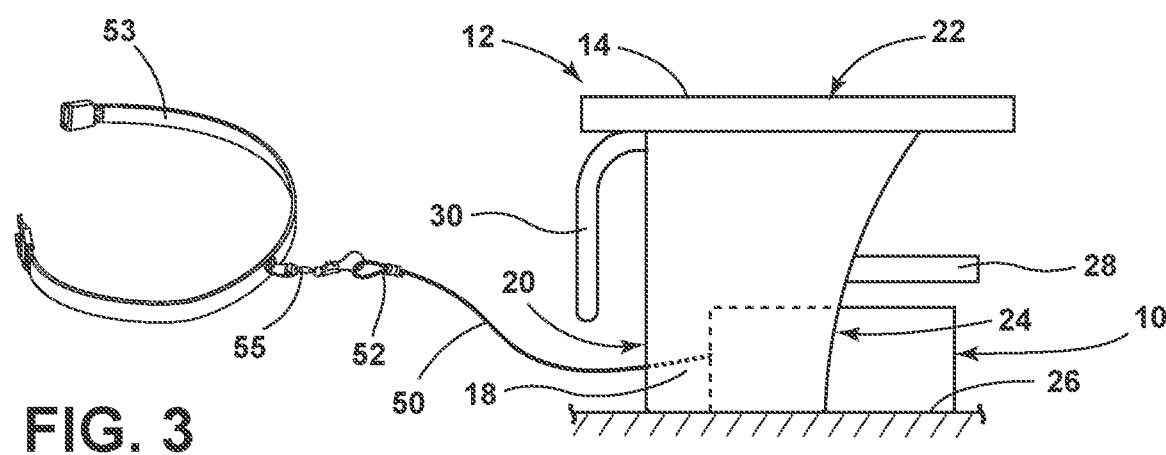
FIG. 3 is a side plan view of the starting block and timing device, according to some examples.
Figure 5:
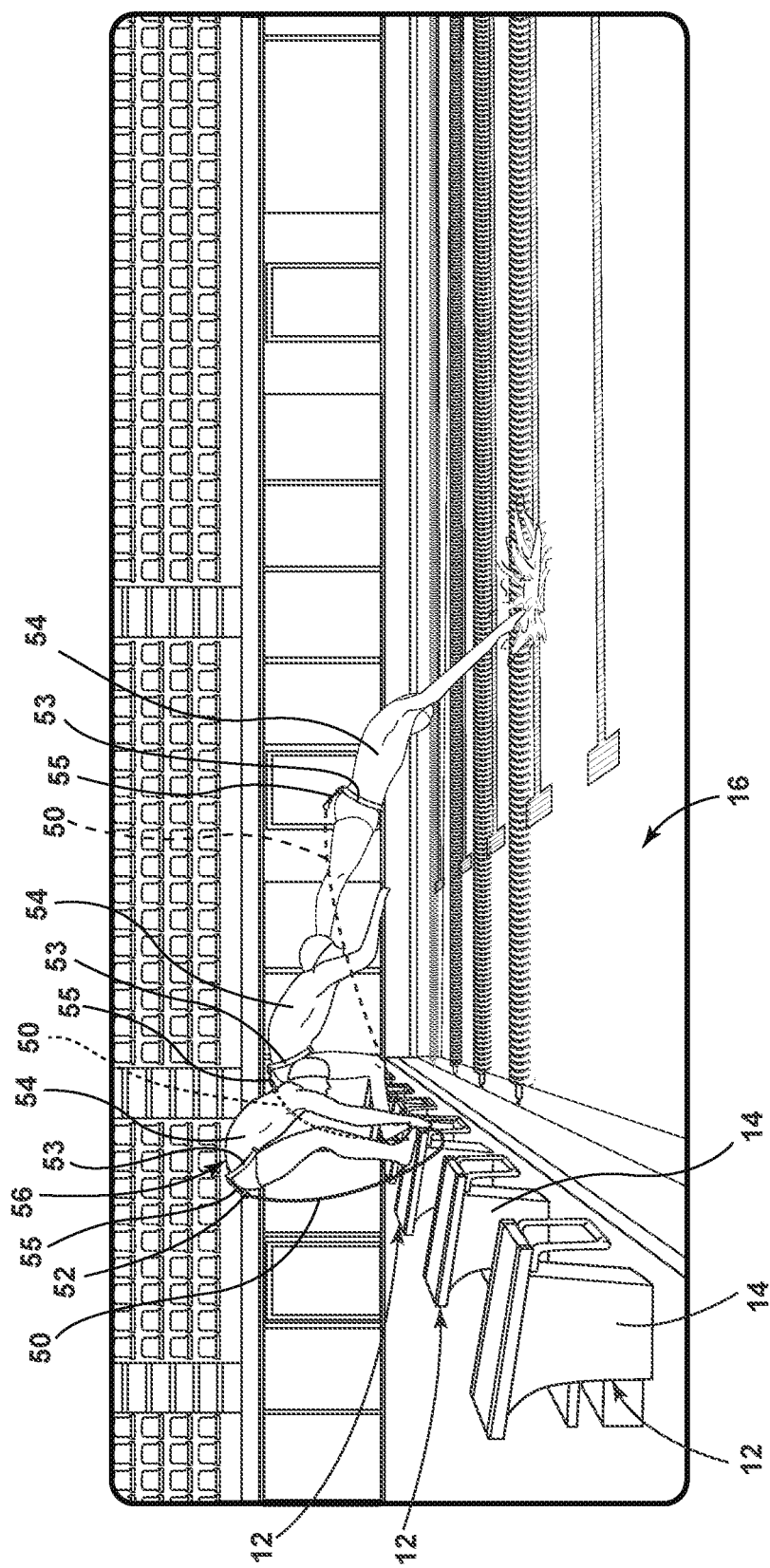
FIG. 5 is a side perspective view of a user utilizing the timing device, according to some examples.

Referring to FIGS. 1-3, a timing device 10 may be attached to various starting blocks 12 and/or proximate starting locations for various timed events. For example, as illustrated in FIGS. 1-3, the timing device 10 may be attached to a swimming-starting platform 14. The platform 14 is suitably rested or mounted on a deck surface 26 adjacent to a pool 16 (FIG. 5). The platform 14 may include a base 18, which may include a lower region 20, an upper region 22, and a middle region 24. The lower region 20 may be operably coupled to the deck surface 26 adjacent to the pool 16. The upper region 22 may include the platform 14 from which a swimmer begins. The middle region 24 may include a step 28 to facilitate the climbing onto the platform 14.

A backstroke arm structure 30 may be mounted on the starting block 12. The backstroke arm structure 30 may extend forwardly and/or downwardly of the platform 14. As illustrated in FIG. 1, the timing device 10 may also be mounted to the front portion of the platform 14. However, as illustrated in FIG. 2, the timing device 10 may be attached to the backstroke arm structure 30, or, as illustrated in FIG. 3, the timing device 10 may be disposed proximate the platform 14. It will be appreciated that the timing device 10 may be disposed on any portion of the starting block 12 and/or in any other location proximate the starting location of a user without departing from the scope of the present disclosure. As will be discussed in more detail below, an elongated member 50 is extendable from a housing 58 of the timing device 10. The elongated member 50 may extend above, below, inward, and/or outward of the starting block 12, and/or any other starting location.

Figure 4:
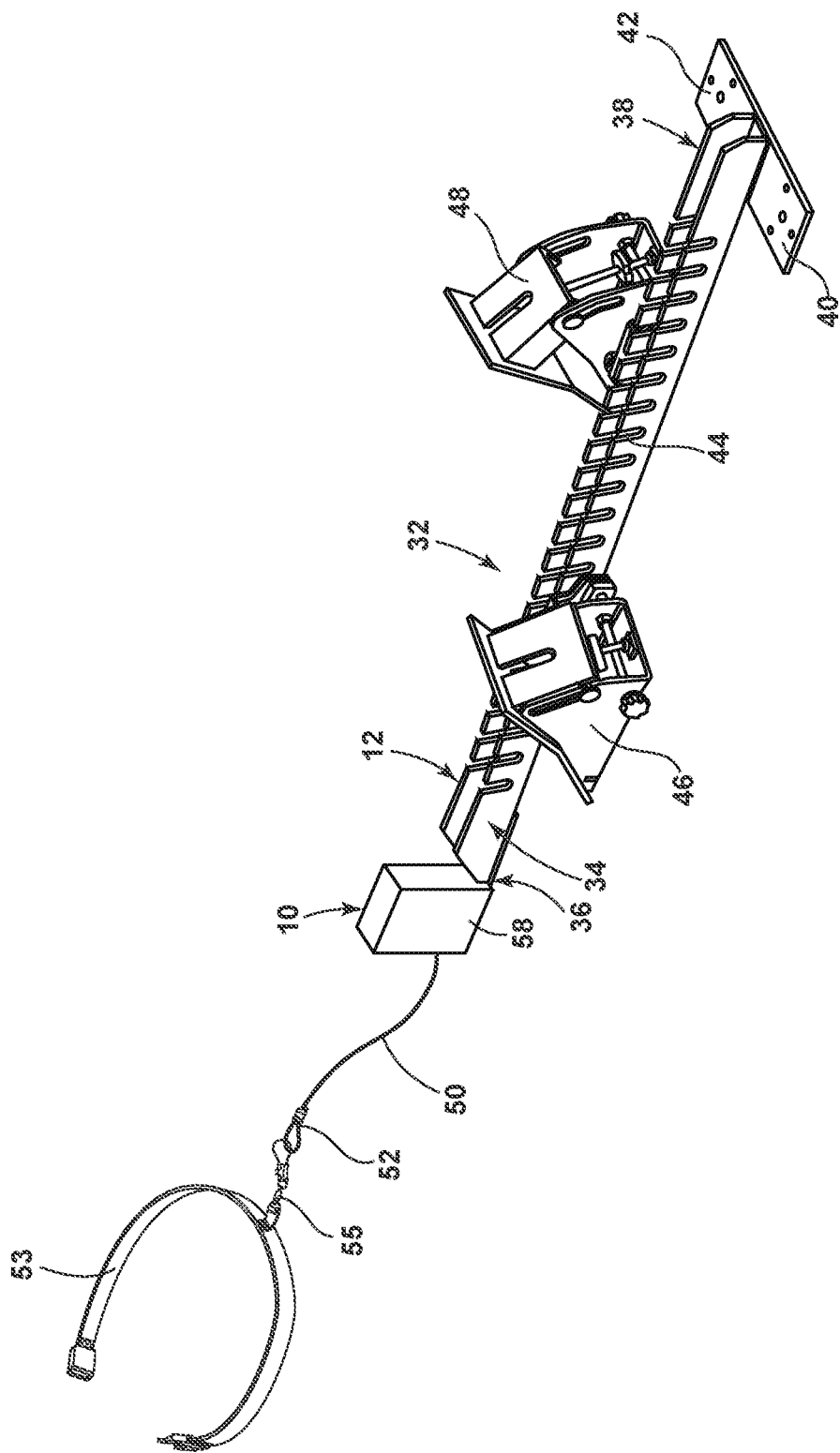
FIG. 4 is a rear perspective view of a track starting block with the timing device attached to a front portion thereof, according to various examples.

Referring to FIG. 4, the timing device 10 may be coupled to any other type of starting device, such as a track starting block 32. The starting block 32 may include an elongated frame 34 having a longitudinal axis (not shown), which extends between a first end portion 36 and a second end portion 38 of the frame 34. The frame 34 is adapted to be attached to a ground at one or both end portions 36, 38 of the frame 34. In the illustrated example, the frame 34 has mounted elements 40, 42 having holes, wherein a fastener, for instance, pins or spikes, may be inserted into the ground and thereby fix the frame 34 to the ground.

As illustrated in FIG. 4, the frame 34 is made of a profile having U-shaped profile slits 44 arranged there along having a mutual spaced apart relationship along the elongated frame 34. The slits 44 are adapted to receive take-off blocks 46, 48 therein that may be individually adjusted along the frame 34. The timing device 10 may be coupled to the first end portion 36 of the block 32. It will be appreciated that the timing device 10 provided herein may be used by any type of user for timing any event without departing from the scope of the present disclosure. Accordingly, in some implementations, the timing device 10 may not be attached to a block 12, 32 while in use.

Figure 9:
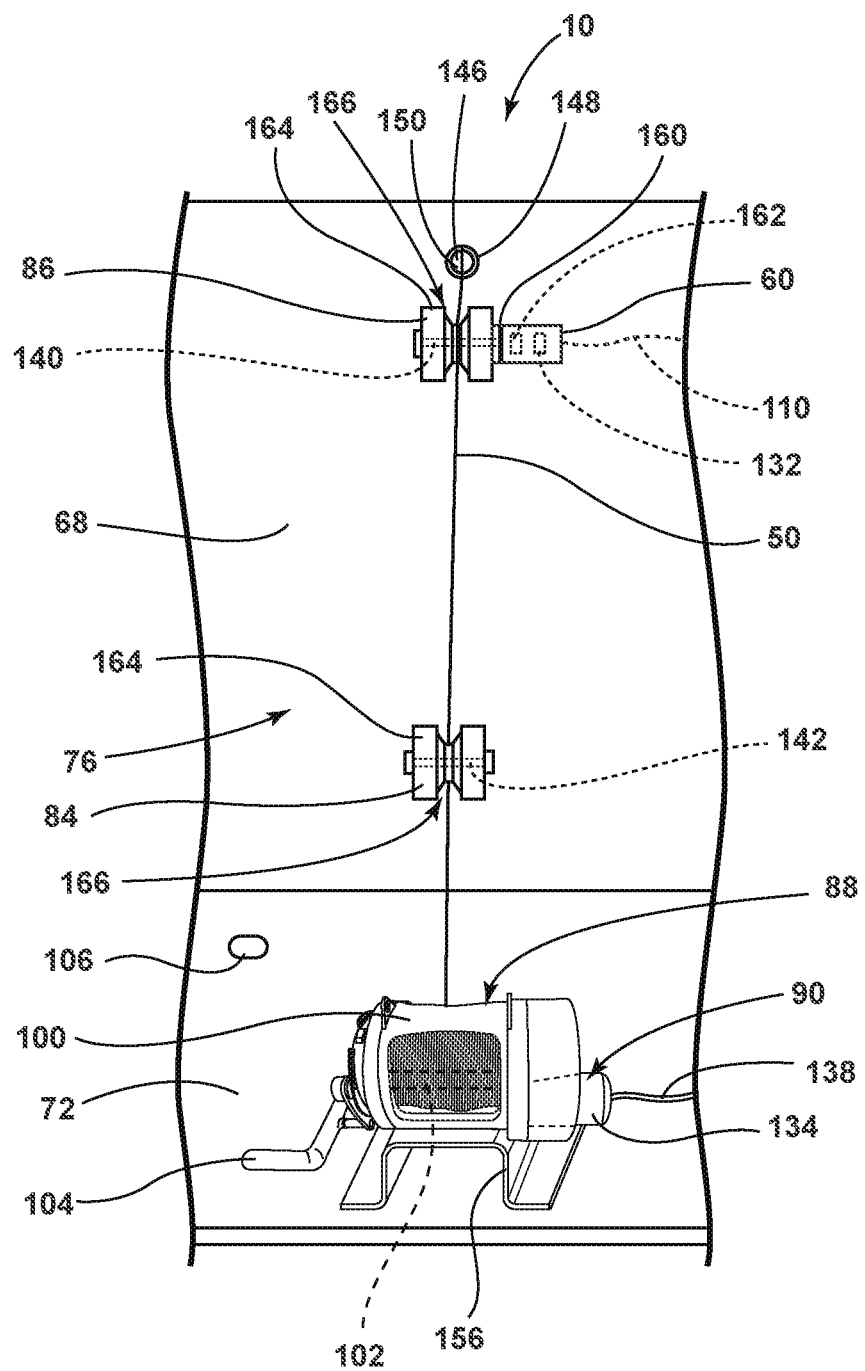
FIG. 9 is a partial perspective view of the timing device having a reel and first and second wheels each operably coupled to an elongated member, according to some examples.

Referring to FIGS. 1-5, the timing device 10 includes the elongated member 50 that may be attached to a user 54. The elongated member 50 may be in the form of a string, fish line, band, tube, cord, and/or any other material that may be disposed around a spool 102 (FIG. 9). Moreover, the elongated member 50 may be substantially inelastic in some examples. In alternate examples, the elongated member 50 may be elastic in some examples, a clip 52 may be disposed at one end portion of the elongated member 50 and may be attached to clothing worn by the user 54. In other examples, a belt 53 or any other attachment device may be coupled to the elongated member 50 for removable fixation of the elongated member 50 to the user 54. A swivel assembly 55 may be disposed between the elongated member 50 and the belt 53 for releasably coupling the belt 53 to the elongated member 50.

Figure 6:
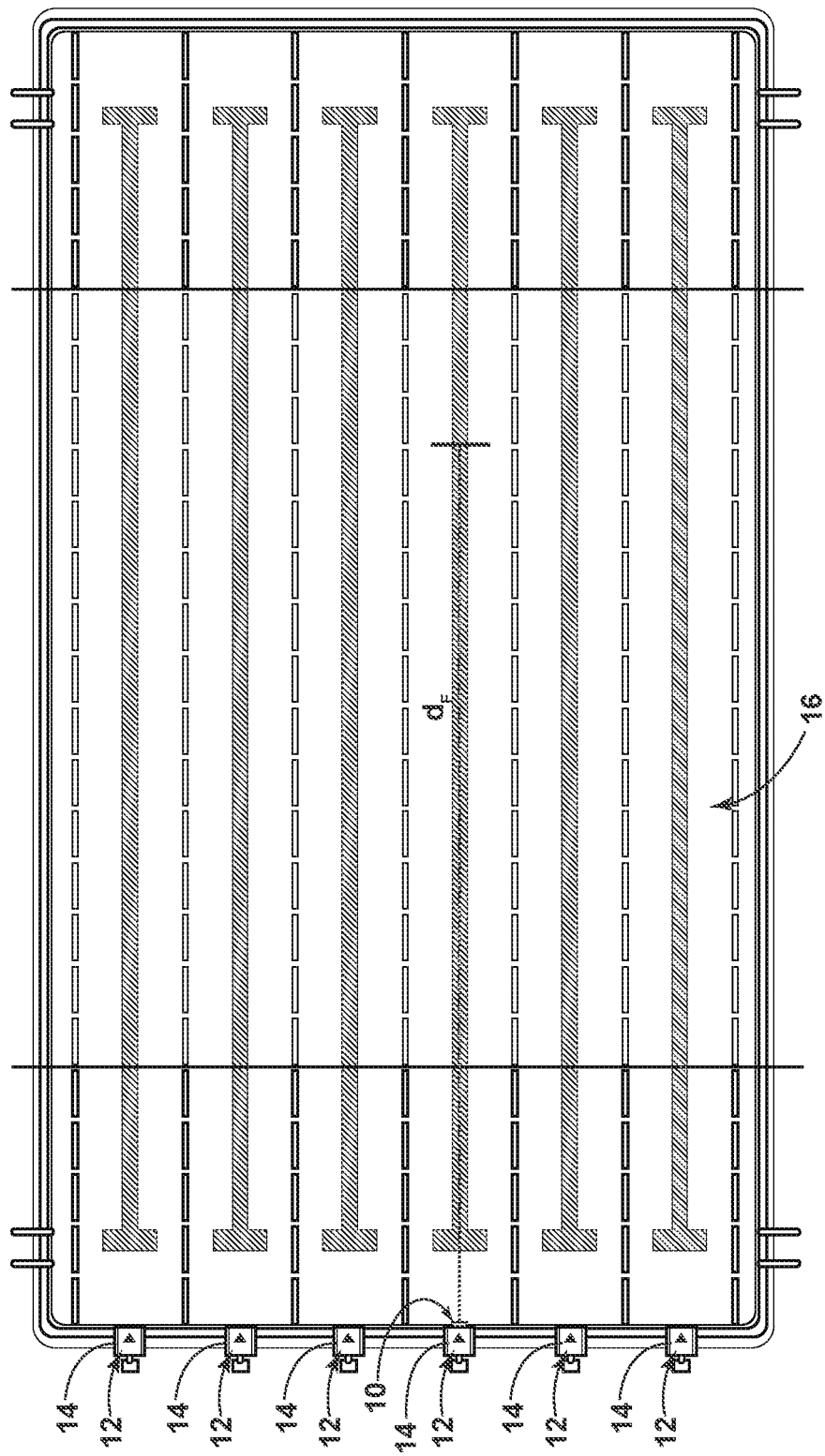
FIG. 6 is a top plan view of a competition swimming pool, according to some examples.
Figure 13:
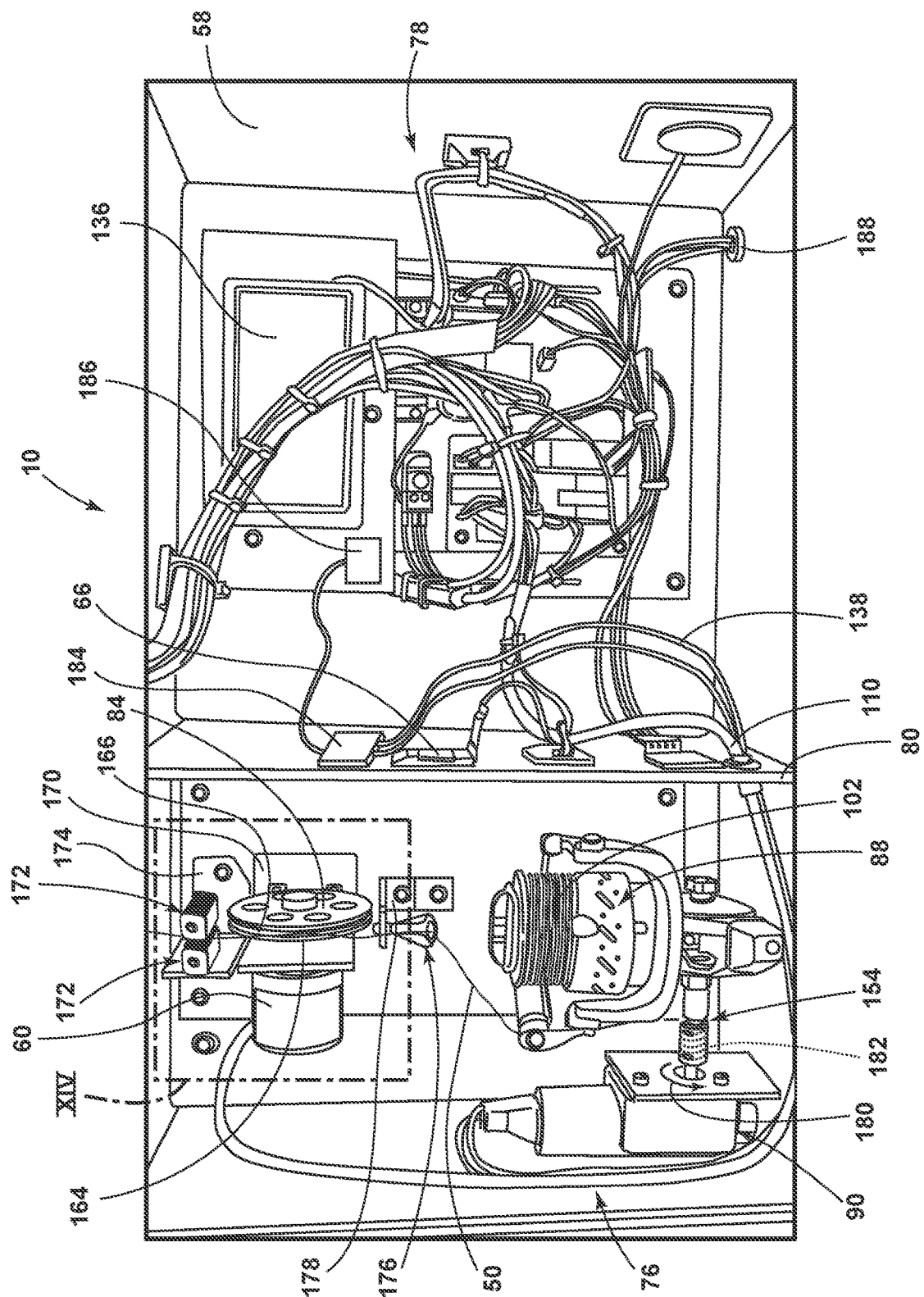
FIG. 13 is a top perspective view of the timing device, according to some examples.

With reference to FIGS. 5 and 6, the user 54 begins in the starting position 56 with the elongated member 50 attached to the user 54 and extending an initial distance $d_0$ (FIG. 7) from the housing 58 of the timing device 10. Once the user 54 is further from the housing 58 than they were at the initial distance do, the elongated member 50 unreels from within a housing 58 of the timing device 10. As the elongated member 50 is extended, an encoder 60 (FIG. 8) within the timing device 10 measures a revolution per minute of a wheel 84, 86 that contacts the elongated member 50. The encoder 60 determines the revolutions of the wheel 84, 86, which is sent to a controller 62 (FIG. 13). Based on the revolutions of the wheel 84, 86 over time, data about the user 54 may be generated, stored, and/or calculated for each distance covered by the user 54.

Referring still to FIGS. 5 and 6, the timing device 10 may be configured to store data from the encoder 60 and calculate various information about the user 54 over a predefined distance $d_F$. For example, the timing device 10 may be configured to track a user's 54 velocity for a predefined distance di, such as 15 meters. Such a calculation may be difficult to continually calculate through other means currently known by one of ordinary skill in the art. In some examples, the elongated member 50 extends the initial distance $d_0$ from the housing 58 of the timing device 10 for attaching the elongated member 50 to the user 54.

With further reference to FIG. 5, in some examples, the user 54 of the timing device 10 may use the device independently in some instances, the timing device 10 may be attached to the user 54, as provided herein, and the user 54 may initiate a timing sequence through any means known in the art, such a start button 122 (FIG. 8), an application 158 (FIG. 8) on the electronic device 64 (FIG. 8), etc. Once the timing sequence has been initiated, the user 54 may move to their starting location, such as on the platform 14, and the elongated member 50 may be wound into the housing 58 until any slack in the elongated member 50 between the housing 58 and the user 54 is removed. In some instances, the sequence proceeds once the elongated member 50 reaches a predefined tension. Then, the timing device 10, through a speaker 96, may direct the user 54 to prepare for the start of the timing sequence. After, the timing device 10 may beep or otherwise indicate to the user 54 that they are to begin extending the elongated member 50 from the housing 58. In some examples, the amount of time between to prepare for the start command and the beginning of the timing sequence may be varied between a predefined set of times. For example, the time between the two commands may be between 0.5 seconds and 1.5 seconds in some cases. It will be appreciated, however, that the predefined set of times may be any amount time without departing from the scope of the present disclosure. In other cases, the user 54 may set the time between the two commands.

Figure 7:
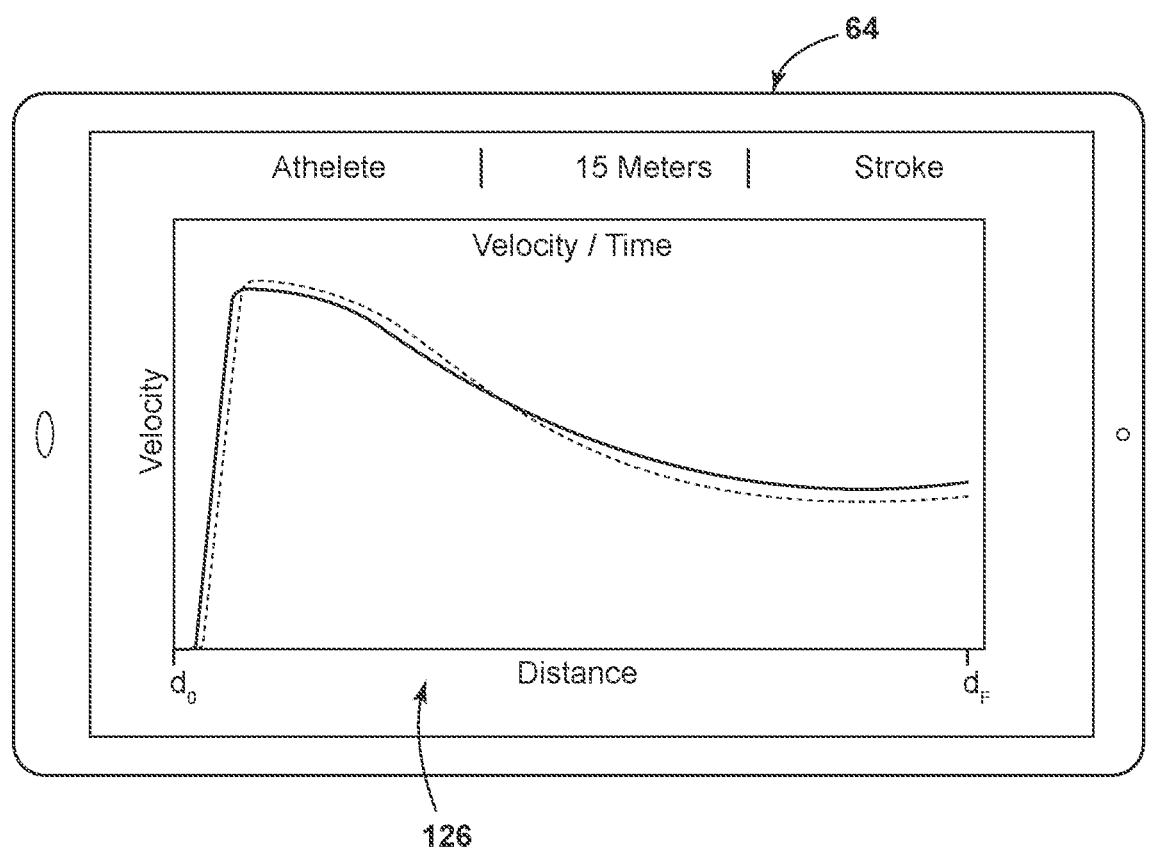
FIG. 7 is a front plan view of an exemplary electronic device that may communicate with the timing device with various information provided on a display of an electronic device, according to some examples.
Figure 8:
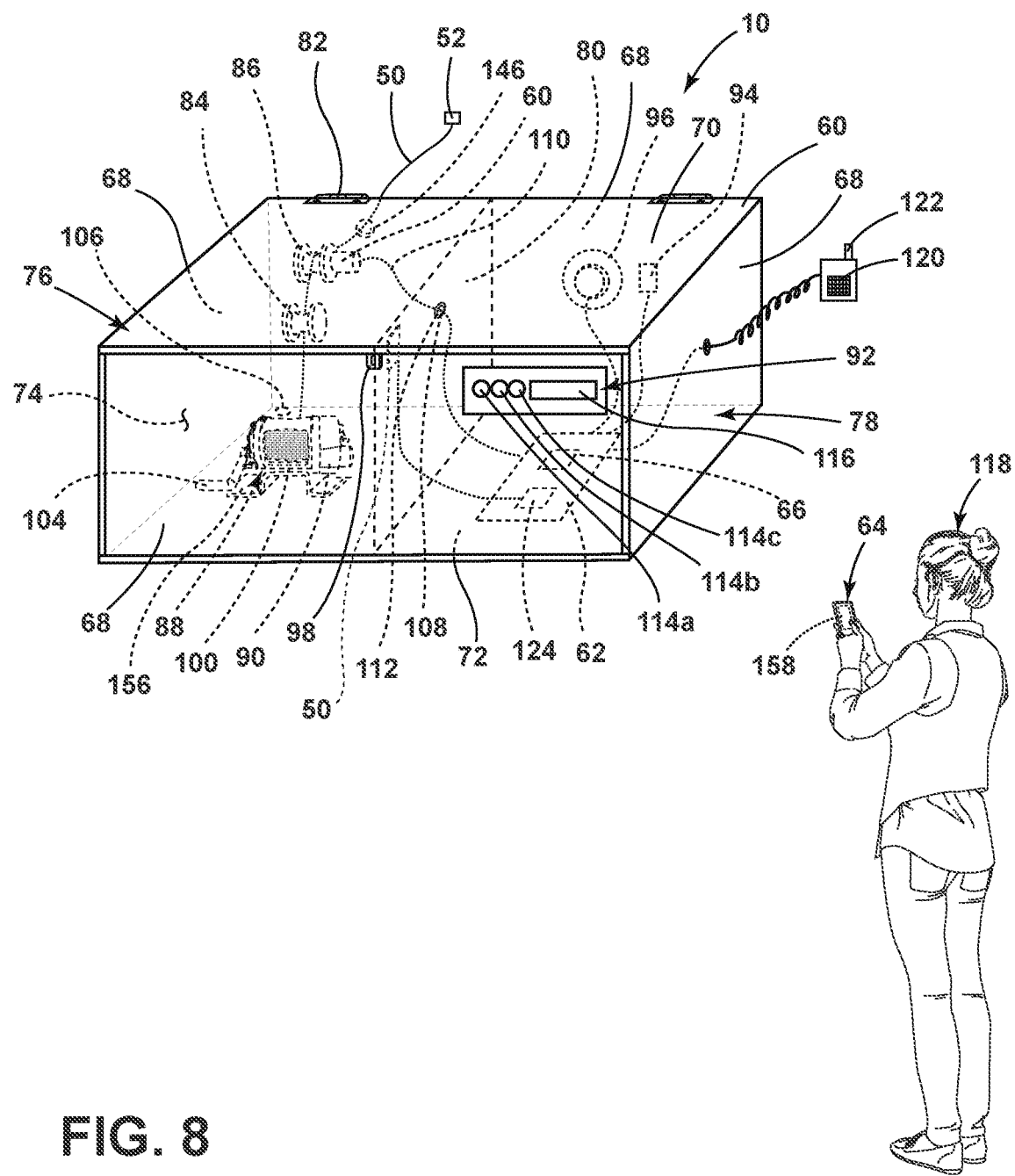
FIG. 8 is a perspective view of the timing device and a person utilizing the electronic device that may be operably coupled with the timing device, according to some examples.

With reference to FIGS. 6 and 7, as provided in more detail below, the timing device 10 may communicate with an electronic device 64 through one or more wireless transceivers 66 (FIG. 8). As the elongated member 50 is extended from the housing 58, the electronic device 64 may receive the various data collected by the controller 62. For example, the electronic device 64 may receive data relating to the time difference between the initiation of the clock 124 (FIG. 8) and the initial extension of the elongated member 50 from the housing 58, which may be calculated as a reaction time of the user 54. The timing device 10 may also calculate and/or store a user's 54 distance, velocity, acceleration, and/or any other desired collected and/or calculated data.

Moreover, as exemplarily illustrated in FIG. 7, the electronic device 64 may display the user's 54 velocity over the desired predefined distance $d_F$. Additionally, the electronic device 64 can store data about a plurality of users 54, such as their name, the predefined distance dE, an event and/or stroke, etc. It will be appreciated, however, that any other data may be provided to the electronic device 64. It will further be appreciated that the data can be used in any manner and/or for any computation without departing from the scope of the present disclosure. Additionally, the timing device 10 may calculate and/or store various instances in which a user 54 completes the timing sequence while attached to the timing device 10. The various timing sequences may be displayed on a common graph to illustrate variances in performance between instances. Moreover, various users 54 may have their data displayed simultaneously in order to compare various users' 54 performances.

In some cases, three various times may be calculated and stored by the timing device 10, including a reaction time, which as provided herein, may be calculated as the time between the start of the timing sequence and the moment the elongated member 50 begins to extend from the housing 58. The timing device 10 may also store a total time, which may be the time from the initiation of the timing sequence until the elongated member 50 has been extended a predefined distance from the housing 58 and/or the encoder 60. Lastly, the timing device 10 may also store an "activity time," which may be the total time minus the reaction time.

Referring to FIG. 8, the housing 58 may have a plurality of side surfaces 68, a top surface 70, and a bottom surface 72 that defines a compartment 74. The compartment 74 may have a first portion 76 and a second portion 78 separated by a divider 80. It will be appreciated, however, that the compartment 74 may have a single portion or more than two portions in other examples without departing from the scope of the present disclosure. According to some examples, an exterior surface 68, 70, 72 of the housing 58 may be pivotable about a hinge 82 to provide access to the first and/or second portions 76, 78 of the housing 58. Moreover, a latch 98 may be disposed on an opposing side of the housing 58 for releasably maintaining the pivotable surface 68, 70, 72 in a locked and an unlocked position. For example, the timing device 10 can be provided with a spring biased push-push latch 98 so that the top surface 70 can be released from the closed position by pressing on the top surface 70 to allow the top surface 70 to move to an open position. It will be appreciated that the hinge 82 and the latch 98 may be disposed on any portion 76, 78 of the housing 58 without departing from the scope of the present disclosure.

Water resistant components of the timing device 10 may be disposed within the first portion 76. For example, one or more wheels 84, 86, a reel 88, the encoder 60, and a motorized drive assembly 90 that is coupled to the reel 88 may be disposed in the first portion 76. The controller 62, a user interface 92, a light source 94, and/or a speaker 96 may be disposed within the second portion 78.

The elongated member 50 may be wound around the reel 88. As the user 54 moves further from the housing 58 with the elongated member 50 attached to them, the elongated member 50 may extend from the reel 88. As the elongated member 50 is unreeled from the spool 102 of the reel 88, the elongated member 50 may pass on an underside of a first wheel 84. The elongated member 50 may then be directed to a second wheel 86. The elongated member 50 then exits the timing device 10 through an aperture 146 defined by the housing 58. The encoder 60 may be operably coupled to the first and/or second wheel 86. As the elongated member 50 is unreeled from the spool 102 and/or rewound around the spool 102, the encoder 60 may determine the number of revolutions of the first and/or second wheel 84, 86. Since the first and/or second wheel 84, 86 has a predetermined radius, the encoder 60 may calculate the length of the elongated member 50 extended from the housing 58.

As the elongated member 50 is rewound around the spool 102, water may be on the elongated member 50 and brought into the first portion 76. Accordingly, a drain 106 may be disposed on a bottom portion of the housing 58 for water removal.

The encoder 60 is operably coupled to the controller 62, which may be disposed within the second portion 78 of the housing 58. Accordingly, the divider 80 may define a void 108 through which one or more wires 110 may be disposed. Moreover, a gasket 112 may be disposed within the void 108. The gasket 112 may be a resilient elastomeric gasket for providing a substantially watertight seal.

Referring still to FIG. 8, the user interface 92 may include one or more switches 114a, 114b, 114c configured to control one or more features of the timing device 10, such as a power switch 114a, a reset switch 114b, and/or a starting switch 114c. The user interface 92 may further include a display 116. The display 116 may provide various information to the user 54 and/or any other person 118 proximate the housing 58. For example, the display 116 may provide information about a user 54 who is attached to the elongated member 50, a distance upon which the timing device 10 is programmed to measure, a velocity/amount of time and/or predefined distance dr, etc.

The speaker 96 may be disposed within the housing 58 and configured to produce audible sounds. The audible sound may provide the commands discussed herein and/or signify a starting time for the user 54. Once the speaker 96 initiates the sound, the timing device 10 may start a clock 124 therein. According to some examples, the time between the audible sound and the extension of the elongated member 50 from the timing device 10 may be calculated as a reaction time of the user 54. In other words, the time in which the user 54 needed to begin forward movement upon hearing the audible sound. In other examples, a person 118 proximate the user 54 may produce the audible sound and/or use a secondary device that is coupled to the timing device 10 for producing the audible noise. For example, a standard timing system may be coupled to the timing device 10 for producing the audible noise and/or an electronic device 64 may be utilized.

In some examples, the timing device 10 may further include the light source 94 and/or a microphone 120. A person 118 proximate the timing device 10, such as a coach, scout, etc., may utilize the microphone 120 and a start button 122 thereon for starting the clock 124 within the timing device 10. The light source 94 may also illuminate when the clock 124 begins to signify the initiation of the timing event. The light source 94 may include any form of light source 94. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the timing device 10.

Referring still to FIG. 8, the timing device 10 may further include one or more of the wireless communication transceivers 66 that may be configured to interact with the electronic device 64. The wireless transceiver 66 (e.g., a BLUETOOTH module, a ZIGBEE transceiver, a Wi-Fi transceiver, an IrDA transceiver, an RFID transceiver, etc.) is configured to communicate with a compatible wireless transceiver 66 of the proximate person's 118 and/or the user's electronic device 64. Additionally or alternatively, the timing device 10 may communicate with the electronic device 64 over a wired connection, such as via a USB connection. In various examples, the timing device 10 may communicate with the electronic device 64 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 2.11, etc.), local area networks (LAN), and/or wide area networks (WAN), including the Internet, providing data communication services.

The electronic device 64 may include a cell phone, a tablet, a key fob, wearable device (e.g., fitness band, watch, glasses, jewelry, wallet), apparel (e.g., a tee shirt, gloves, shoes, or other accessories), personal digital assistant, headphones and/or other devices capable of wireless transmission (e.g., radio frequency, Bluetooth, ultrasonic). In one non-limiting example, the wireless communication transceivers 66 may be a Bluetooth™ RN4020 module or an RN4020 Bluetooth™ low energy PICtail board configured to communicate with the electronic device 64 using Bluetooth™ low energy signals. The wireless communication transceivers 66 may include a transmitter and a receiver to transmit and receive wireless signals (e.g., Bluetooth™ signals) to and from the electronic device 64. It will be appreciated that the wireless communication transceivers 66 may utilize other forms of wireless communication between with the electronic device 64 and other wireless communication transceivers 66, such as Wi-Fi™.

The wireless communication transceivers 66 may be positioned on or within the controller 62. The controller 62 may be a dedicated controller or may be a shared controller (e.g., for multiple timing devices 10). The controller 62 may include a processor 126 (FIG. 13) and a memory 128 (FIG. 13) for executing stored routines 130 (FIG. 13) or for storing information (e.g., related to performance data of the user 54 and/or the electronic device 64). The wireless communication transceiver 66 is configured to communicate with the processor 126 such that one or more routines 130 stored in the memory 128 are activated.

With reference to FIGS. 7 and 8, an application 158 on the electronic device 64 may be configured to utilize a device link interface to interact with the timing device 10. When connected to the timing device 10, the application 158 may be configured to utilize information from the controller 62. For example, the application 158 may create various data displays (e.g., charts, graphs, etc.) that are specific to a user 54 or group of users 54. The application 158 may also store information about one or more users 54 therein and/or the performance history, or data, of one or more users 54.

Referring to FIG. 9, according to some examples, the reel 88 includes a main body 100 having opposing first and second (e.g. right-hand and left-hand) sides. A spool 102 is rotatably mounted to the main body 100 via a spool axle and configured for manual actuation by a hand crank 104 disposed on the first side of main body 100. In some examples, the main body 100 may be adapted with a motorized drive assembly 90 that is attached to the second side of main body 100.

The encoder 60 may use at least two methods used for determining velocity from a signal provided by the encoder 60. The first method is to sum pulses over a fixed period of time (i.e., the frequency method). The calculation for this method is velocity=(sum of pulses/time interval)*(rotational distance of the first or second wheel 84, 86). The second method uses the time interval between successive pulses to determine an instantaneous velocity (i.e., the period method). The period method can give an updated velocity value as each pulse arrives from the encoder 60. In order to utilize either method, the encoder 60 may include a rotor 160, a pulse detection module 162, and a rotational calculation module 132. The rotor 160 is adapted to rotate with the first or second wheel 84, 86. To monitor its rotation, the encoder 60 may be provided in close proximity to the rotor 160. It will be appreciated that the encoder 60 described herein is exemplary and that the encoder 60 can be any device that outputs an event (i.e., a pulse) that is indicative of the rotational distance or rotational angle traveled by the rotating member without departing from the scope of the present disclosure.

According to some examples, the rotor 160 is formed as a timing gear consisting of magnetic material and a multiplicity of timing teeth, which protrude to provide the outer surface of the timing gear. The encoder 60 includes a sensor, which is composed of a permanent magnet and a coil, such that it can detect the rotation of the timing gear as a change in the magnetic resistance. The flux of the magnetic field formed by the permanent magnet is variable depending upon the relative position of the encoder 60 in relation to the teeth on the outer surface of the rotor 160. Since the teeth are arranged on the circumference of the rotor 160 at regular intervals, the output voltage becomes an alternating waveform, such as a sine wave. The voltage signal is then inputted into a wave shaping circuit, which shapes the alternating waveform into a pulse train signal. In this way, the pulse signal is indicative of the rotational distance that has been traveled by the rotating member. Although the above description references a particular type of rotor 160 and encoder 60, this is not intended as a limitation on the broader aspects of the present examples. On the contrary, other types of rotors 160 and encoder devices 60 (e.g., using an optical sensor) may be used to monitor the rotation of the first or second wheel 84, 86 and/or extensions and retractions of the elongated member 50 from the housing 58.

In some examples, the pulse detection module 162 stores a timestamp for each pulse detected. Based on this stored data, the rotational calculation module 132 is then able to determine rotational data for the first or second wheel 84, 86. The timestamp value stored in the temporary location is subtracted from a newly detected time stamp value. This time difference value is a delta time between the two pulses, which can, in turn, be used to compute rotational velocity for the rotating member (e.g., rotational velocity=distance between pulses/delta time). As each additional time stamp value arrives, it is stored in the data table and the previously stored value is subtracted to produce a new velocity value. In this way, the updated rate is equal to the incoming pulse stream rate. Based on the circumference of the portion of the first or second wheel 84, 86 that the elongated member 50 contacts, velocity data (or a rotational velocity) for the first or second wheel 84, 86 is computed. Likewise, acceleration data, and/or any other desired data, is computed for the first or second wheel 84, 86.

Referring still to FIG. 9, the reel 88 may be operably coupled to the motorized drive assembly 90. The motorized drive assembly 90 includes an electric motor 134 mounted to the reel 88. In some examples, the motor 134 is configured as a brushless motor that is operably coupled to a power source 136 via a power cable 138. According to some examples, the power cable 138 may couple to the controller 62 and/or another component within the timing device 10. Additionally, and/or alternatively, the power cable 138 may couple to a power source 136 that is external from the timing device 10.

With further reference to FIG. 9, the first and second wheels 84, 86 may be rotatable about respective first and second axles 140, 142. In some examples, the first and second axles 140, 142 are parallel to one another. In other examples, the first and second axles 140, 142 may be laterally and/or vertically offset from one another. Each of the first and second wheels 84, 86 has a cylindrical peripheral surface 164 in which a groove 166 is provided. The width of the groove 166 may be larger than the thickness of the elongated member 50. According to some examples, the elongated member 50 is wrapped around the spool 102, disposed below the second wheel 84, 86, and wrapped around a top portion of the first wheel 84 prior to exiting through the aperture 146 of the housing 58. The first and second wheels 84, 86 may be made of any practicable material. In some examples, the first and second wheels 84, 86 may be made of a material having a high frictional coefficient such that the linear length of the elongated member 50, when pulled from the housing 58, may be substantially equal to the linear distance that the first and second wheels 84, 86 rotate (i.e., there is minimal slip between the elongated member 50 and the first and/or second wheel 84, 86). Accordingly, a linear velocity at which the elongated member 50 is extended from the housing 58 may be calculated. As provided herein, the timing device 10 may include any number of wheels 84 without departing from the scope of the present disclosure. For example, in some instances, the timing device 10 may be free of any wheels, the timing device may have a single wheel 84, or the timing device may have more than one wheel 84, 86 disposed within the timing device 10.

In some examples, the reel 88 may be disposed on a bracket 156. The bracket 156 may be configured to couple the reel 88 to the bottom surface 72 of the housing 58, or any other second portion 78 of the housing 58. The bracket 156 is of sufficient height that a hand crank 104 of the reel 88 may rotate without contacting the bottom surface 72 of the housing 58.

Referring again to FIG. 9, a bearing 148 may be disposed within the aperture 146 that may be arranged generally perpendicular to a longitudinal axis of the elongated member 50. The bearing 148 may help reduce friction as the elongated member 50 moves through a central bore 150 of the bearing 148 and, consequently, the aperture 146. In some examples, the bearing 148 may include one or more needle rollers. However, it will be appreciated that any type of bearing, or another friction-reducing device, may be utilized within the aperture 146 without departing from the scope of the present disclosure.

Figure 10:
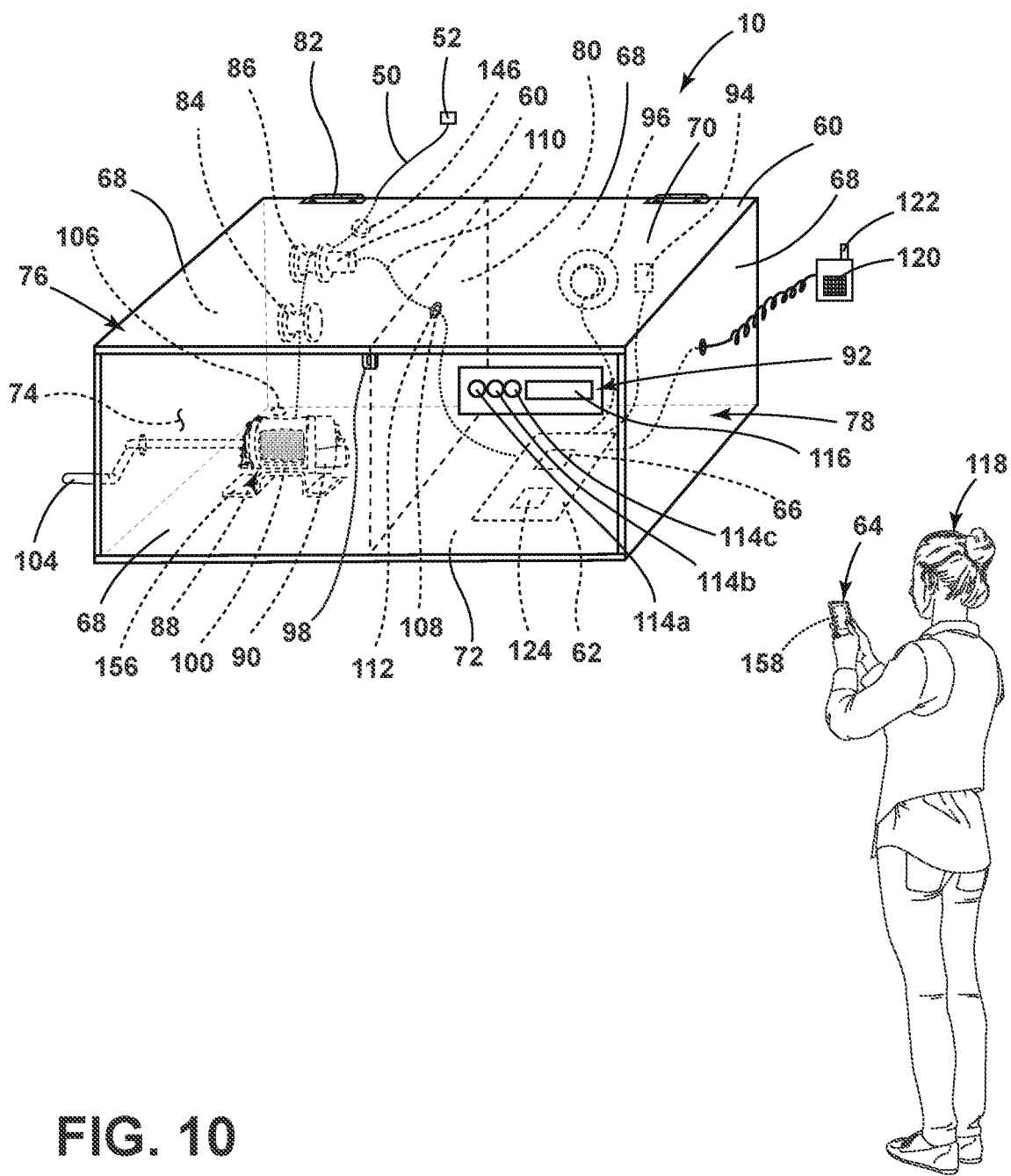
FIG. 10 is a perspective view of the timing device with a reel hand crank extending through a side surface of the housing of the timing device, according to some examples.
Figure 11:
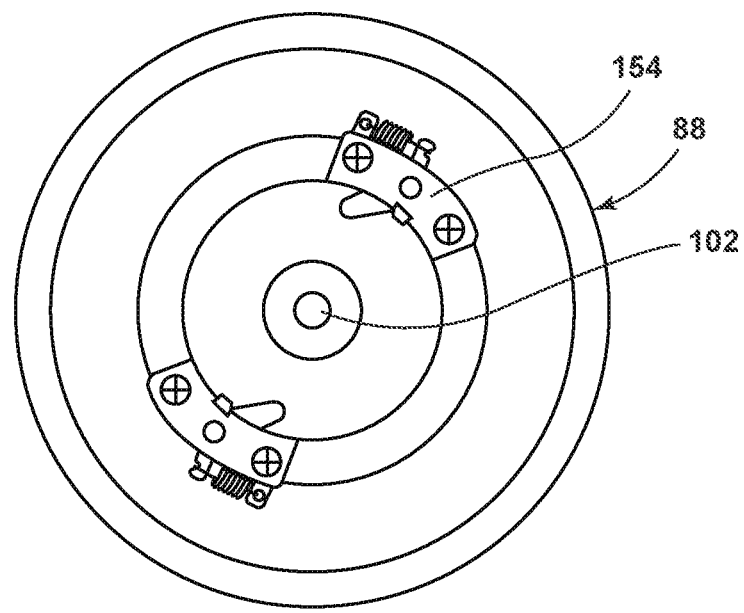
FIG. 11 is a perspective view of a first end portion of the reel, according to some examples.
Figure 12:
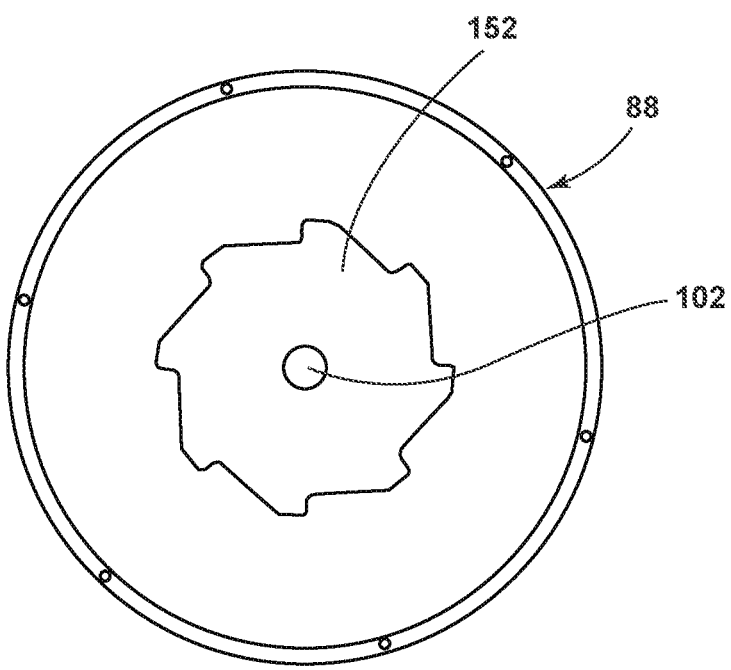
FIG. 12 is a perspective view of a spool and a drive gear operably coupled with the reel, according to some examples.

Referring to FIG. 10, in some examples, the hand crank 104 of the reel 88 may extend through a surface 68, 70, 72 of the housing 58. Accordingly, the hand crank 104 may be utilized to the reel 88 the elongated member 50 back around the spool 102 within the housing 58 once the elongated member 50 has extended to the predefined distance $d_F$. The elongated member 50 may be returned to the initial distance $d_0$ with the usage of the hand crank 104 or the elongated member 50 may be returned to a position within the housing 58 with minimal amounts extending through the aperture 146 for storage of the timing device 10. In some examples, the initial distance $d_0$ is recalculated prior to each use of the timing device 10.

With reference to FIGS. 9-12, the motor 134 has an output shaft connected to one or more gears 152. The gears 152 are attached to a clutch 154 that transfers power to the spool 102. A clutch actuation lever is coupled to a cam mechanism (not shown) to allow the user 54 to adjust the contact pressure between the clutch 154 and the spool 102 thereby providing adjustable drag settings. The motorized drive assembly 90 further includes electronics and controls that allow for velocity control and wireless remote actuation. For example, a user 54 may set the velocity upon which the elongated member 50 is reeled around the spool 102 when the clutch 154 is engaged. According to some examples, the elongated member 50 may extend the initial distance $d_0$ from the housing 58 for attaching the elongated member 50 to a user 54. Once the clock 124 within the timing device 10 begins, the clutch 154 may be released so that the spool 102 may rotate with minimal frictional force. Once the predefined distance $d_F$ of elongated member 50 is unwound from the spool 102, as measured by the encoder 60, the clutch 154 may re-engage so that the user 54 will know that the desired distance has been reached. Once the reset switch 114*b* is actuated, the motorized drive assembly 90 may reel the elongated assembly back into the timing device 10 to the initial distance do, which may also be calculated based on the encoder 60.

Figure 14:
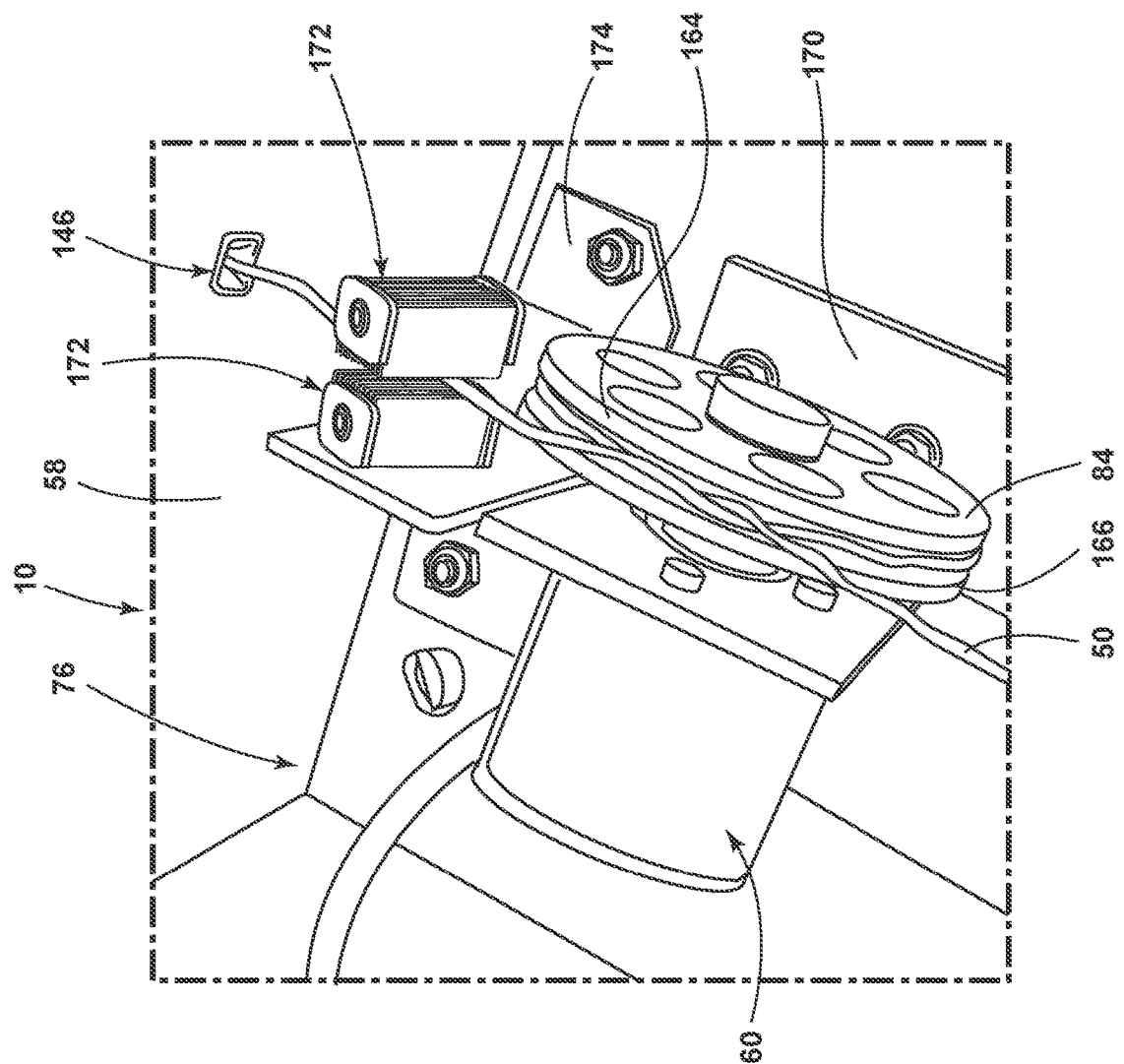
FIG. 14 is an enhanced view of area XIV of FIG. 13.

Referring to FIGS. 13 and 14, the timing device 10 may include the reel 88 and a single wheel 84. The encoder 60 and the wheel 84 may be supported by a base structure 170. A brush 172 may be disposed between the wheel 84 and the aperture 146 in the housing 58. The brush 172 may be configured to remove water and/or any other containment from the elongated member 50 as the elongated member 50 is rewound about the reel 88. The brush 172 may be operably coupled with the base structure 170 or may be disposed on an independent support 174 that is disposed between the wheel 84 and the aperture 146. It will be appreciated that the brush 172 may be replaced with any other structure that is capable of removing water and/or any other containment from the elongated member 50 as it returns to the housing 58 without departing from the scope of the present disclosure.

A guide 176 may be disposed between the reel 88 and the wheel 84 that may be configured to align the elongated member 50 with the wheel 84. In some instances, the guide 176 may be disposed on an independent support 178 that is coupled to the housing 58. As illustrated, the guide 176 includes a base and a frame attached to the base. The base may be referred to as a shoe and is shaped to couple to the support 178. The frame includes an aperture through which the elongated member 50 may be routed. The guide 176 provides guidance both during elongated member 50 deployment as well as when the elongated member 50 is tensioned and/or recovered.

With further reference to FIG. 13, the motorized drive assembly 90 is coupled to the reel 88 through the clutch 154. The clutch 154 may be configured to engage the motor to the reel 88 for returning the elongated member 50 to the reel 88 and release the reel 88 from the motor while the elongated member 50 is being extended from the housing 58. In some examples, the clutch 154 may be configured as a wrap spring clutch 180. Wrap spring clutches 180 are a class of overrunning clutches that allow torque to be transmitted from one shaft to another in only one direction of rotation. The clutch 180 includes a cylindrical input arbor attached to the input hub, a cylindrical output arbor attached to the output hub, and a cylindrical spring 182. The input arbor and the output arbor may be the same diameter and maintained end-to-end in an abutting relationship by a retaining clip, and rotate on a common axis. The spring 182 is connected to the output arbor, slips on the input arbor, and acts as self-engaging brake between them. If a torque is applied to the input hub in the direction of arrow A, the spring 182 wraps down tightly onto a shaft formed by the abutting input arbor and the output arbor, which locks the input arbor and the output arbor together and locks the motor to the reel 88. Conversely, when torque is applied in a direction opposite arrow A, the spring 182 unwraps from the shaft formed by the input arbor and the output arbor, which permits the shaft to slip easily in the opposite direction and allows the reel 88 to swing freely so that the elongated member 50 may be extending from the housing 58.

Referring still to FIG. 13, a motor control device 184 may be disposed within the second portion of the housing 58. The motor control device 184 may be operably coupled with the power source 136 and the motorized drive assembly 90 for providing energy to the motor. The motor control device 184 may also be operably coupled with a volt converter 186. The volt converter 186 may be configured to convert the voltage outputted by the power source 136 from a first value to a second value. In some instances, the motorized drive assembly 90 may use a higher voltage than the controller. Accordingly, the power source may supply the first voltage for the motor control device 184 and the volt converter 186 may down-convert the voltage to a second, lower voltage for usage by any and/or all of the remaining components provided herein. It will be appreciated, however, that any component herein may use any voltage without departing from the scope of the present disclosure.

Referring still to FIG. 13, an electrical charging assembly 188 may be operably coupled to the housing 58 and/or the power source. The charging assembly 188 may be configured as a barrel jack connector in some examples. In some instances, the charging assembly 188 may be capable of charging the power source when the timing device 10 is in an OFF state and deactivated when the timing device 10 is in an ON state.

Figure 15:
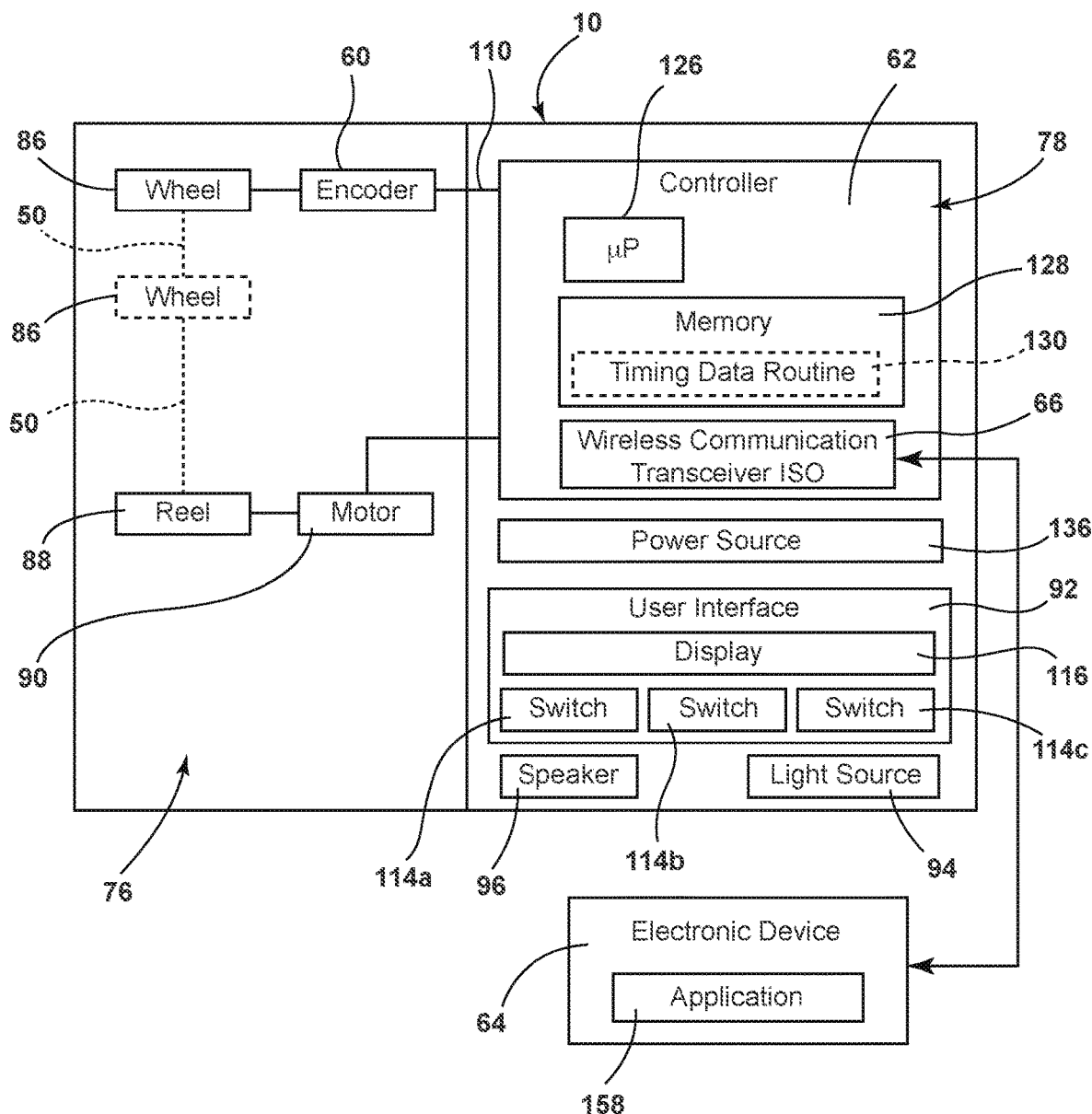
FIG. 15 is a block diagram of the timing device and the electronic device, according to some examples.
Figure 16:
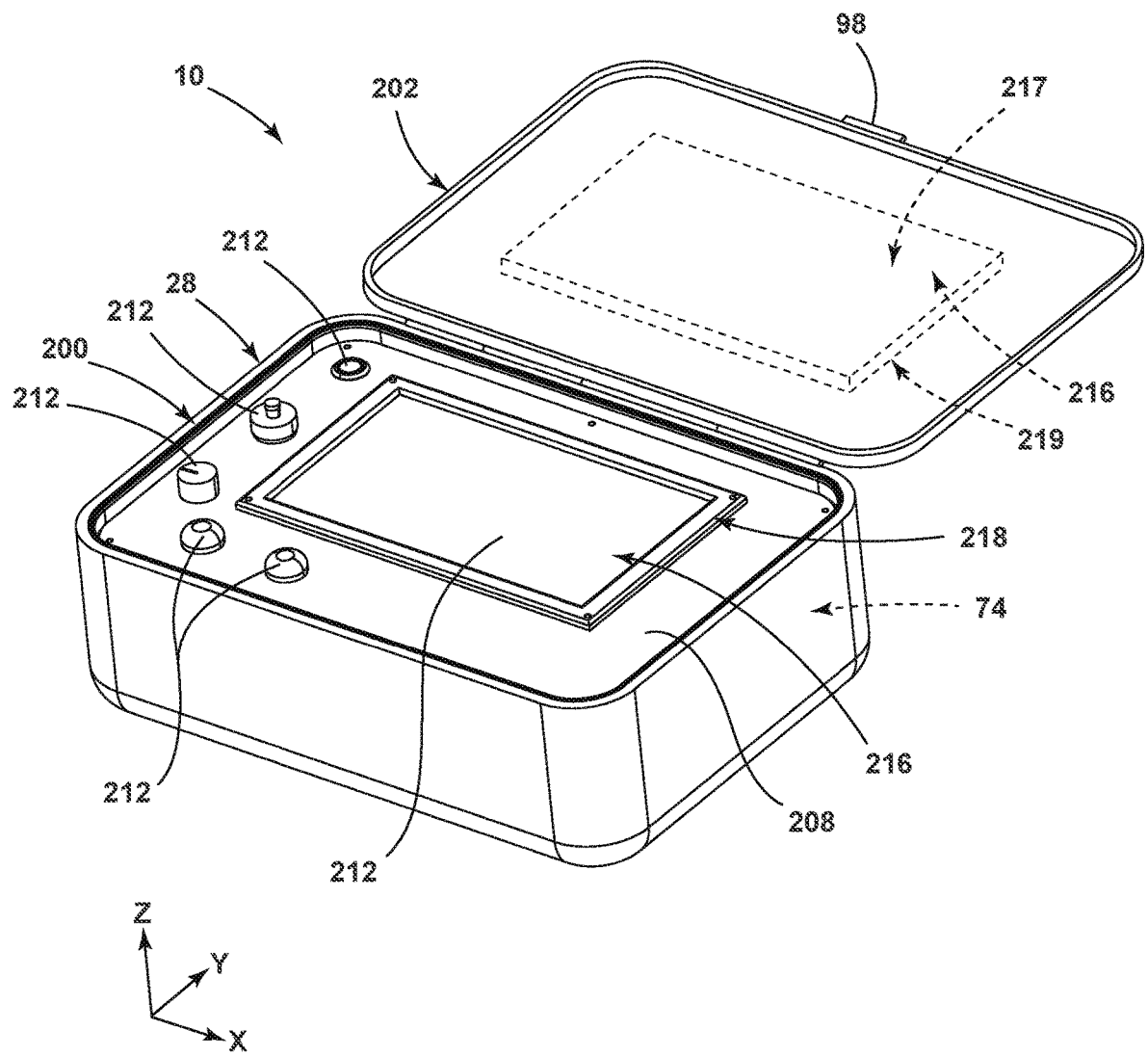
FIG. 16 is a front perspective view of the timing device, according to some examples.
Figure 17:
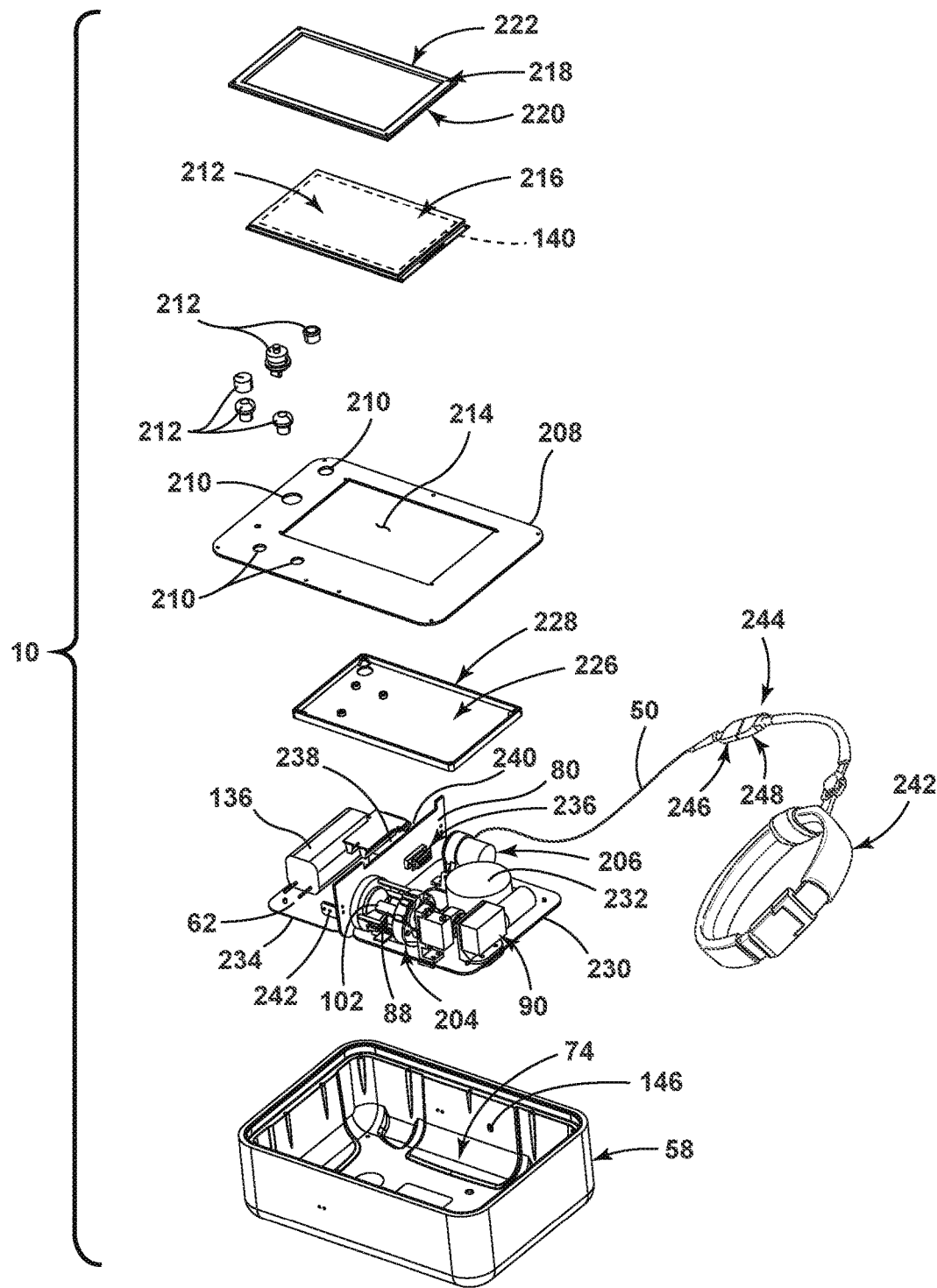
FIG. 17 is an exploded view of the timing device, according to some examples.
Figure 18:
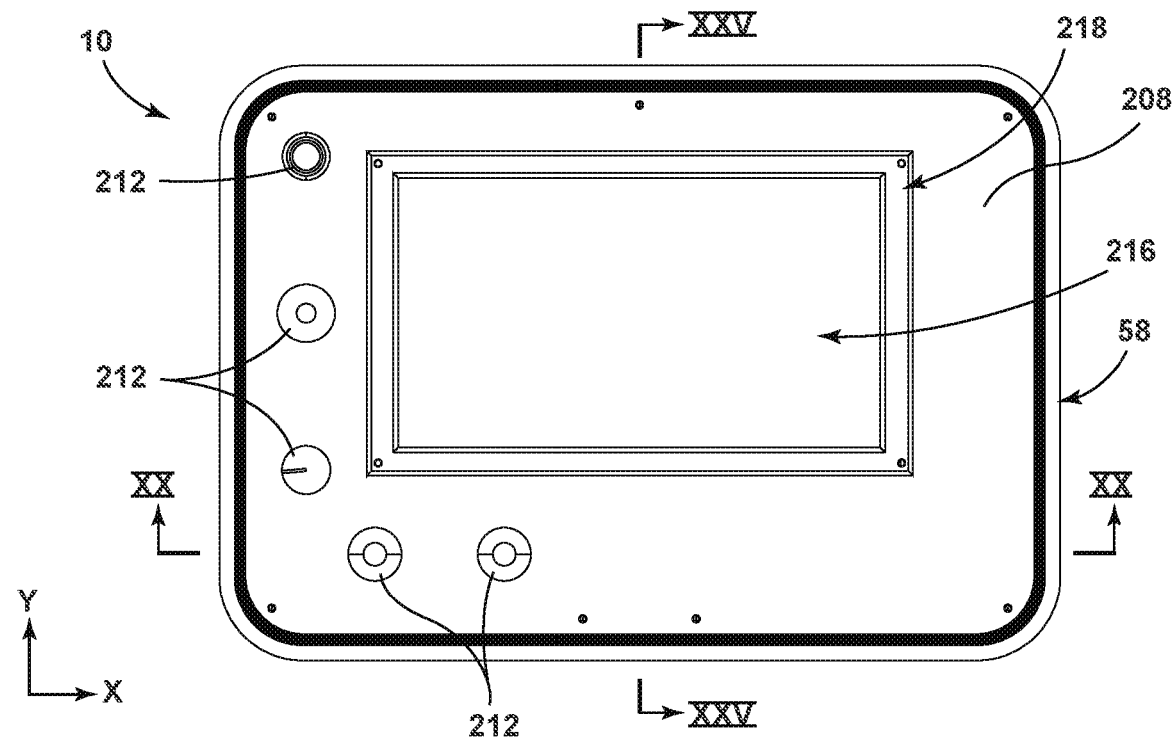
FIG. 18 is a top plan view of the timing device, according to some examples.
Figure 19:
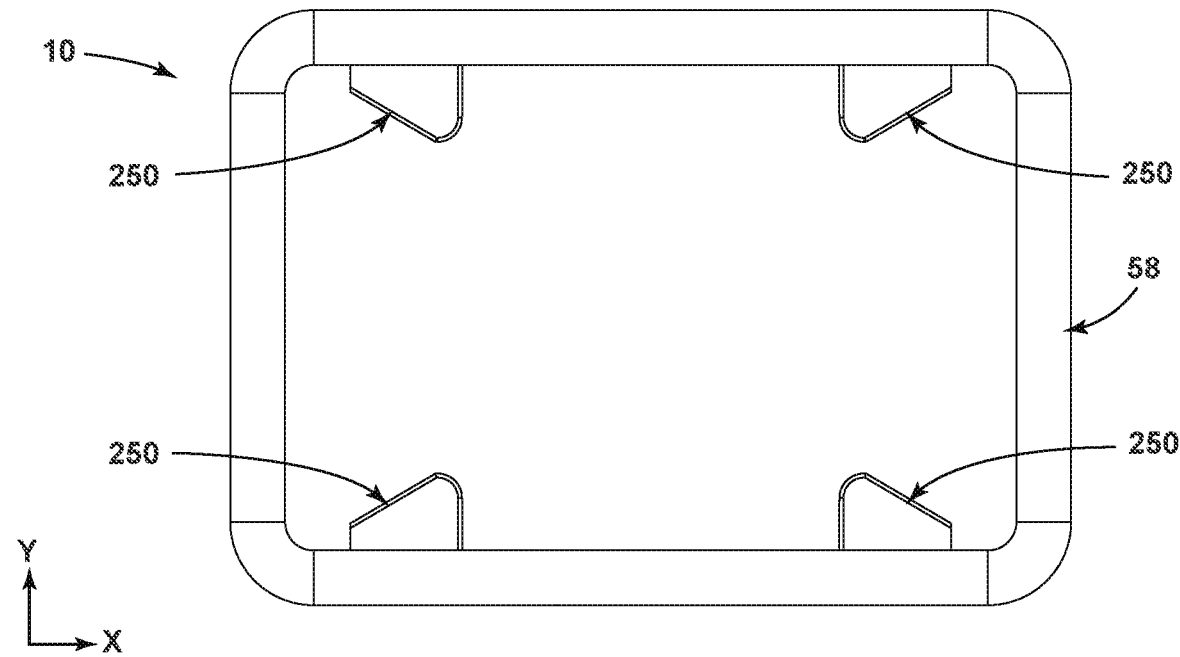
FIG. 19 is a bottom plan view of the timing device, according to some examples.

Referring to FIG. 15, as provided herein, the compartment 74 of the timing device 10 may include one or more portions 76, 78. According to some examples, the elongated member 50 may be disposed around the reel 88 and first and second wheels 84, 86 within the first portion 76. The first and second wheels 84, 86 may be configured to guide the elongated member 50 from the reel 88 to the aperture 146 defined by the housing 58. The encoder 60 may be operably coupled to the first wheel 84, the second wheel 86, and/or the reel 88 and is configured to detect a rotational velocity. As provided herein, according to some examples, motorized drive assembly 90 may be disposed in the first portion 76 and may be operably coupled with the reel 88 for rewinding the elongated member 50 therearound.

The encoder 60 and/or the motor 134 may be operably coupled to the controller 62 that is disposed within the second portion 78 of the compartment 74. The controller 62 within the timing device 10 may include the processor 126 and memory 128. According to some examples, the clock 124 is disposed in the processor 126 or any other timer or counter may otherwise be disposed within the controller 62, to calculate the time needed for the user 54 of the timing device 10 to move the predefined distance $d_F$. It should be appreciated that the controller 62 may include control circuitry such as analog and/or digital control circuitry.

One or more routines 130 are stored in memory 128 and executed by the processor 126 for processing the various inputs and controlling the timing device 10, as described herein. A power source 136 is connected to the timing device 10. The power source 136 may be a battery that is storable within the housing 58 and/or the timing device 10 may be electrically coupled to an external power source. The timing device 10 may also be equipped with one or more additional sensors for detecting various actions of the user 54 and storing the detected data. Moreover, the user 54 of the timing device 10 may alternatively, or additionally, wear one or more additional sensors for detecting their movement and/or any other desired information.

With further reference to FIG. 15, the application 158 on the electronic device 64 may be configured to utilize a device link interface to interact with the timing device 10. When connected to the timing device 10, the application 158 may be configured to utilize information from the encoder 60, motor 134, and/or any other assembly that is operably coupled to the timing device 10. The application 158 may also be configured to operate when untethered from the timing device 10, such as after the user 54 has completed their usage of the timing device 10.

Referring still to FIG. 15, the timing device 10 may be configured to communicate with one or more remote sites such as a server via a network. The one or more remote sites may include a data store. The server may be one or more computer servers, each generally including at least one processor and at least one memory, the memory storing instructions executable by the processor, including instructions for carrying out various steps and processes described herein. The server may include or be communicatively coupled to a data store for storing the collected data, as well as parameters for evaluating various users 54 of the timing device 10. Further, the server may store information related to multiple users 54 performing various strokes and/or races at various distances.

The timing data routine 130 may process signals from the encoder 60, motor 134, and/or reel 88 to calculate various performance characteristics of a user 54. For example, the timing data routine 130 may provide data that can be used to determine the acceleration of a user 54, instantaneous velocity of the user 54, time to complete the predefined distance $d_F$, etc. As provided herein, an instantaneous velocity means a velocity of the user 54 at each time that is measurable through a pulse of the encoder 60, or another device capable of measuring the extension velocity of the elongated member. Accordingly, the instantaneous velocity will vary based on the capabilities of the chosen encoder 60.

Referring now to FIGS. 16-35, the timing device 10 is illustrated according to various examples of the present disclosure. For purposes of convenient description, the timing device 10 may be considered to be oriented parallel to an X-Y plane, and a direction perpendicular to the X-Y plane is denoted as a Z-direction (X, Y, and Z being three mutually perpendicular directions). As used herein, the X-direction refers to the longitudinal direction across the timing device 10. As used herein, the Y-axis refers to the longitudinal direction across the timing device 10. As used herein, the Z-axis refers to the vertical direction.

As illustrated the timing device 10 may include a timing device housing 58 that may have a body 200 and a lid 202. However, it will be appreciated that the lid 202 may not be present in some examples. In examples including a lid 202, the lid 202 may be hingedly or otherwise coupled with the body 200. Moreover, a latch 98 may be disposed on an opposing side of the timing device housing 58 for releasably maintaining the lid 202 in a locked and an unlocked position. The body 200 may at least partially define the compartment 74 described above, which may have a first portion 76 and a second portion 78 separated by a divider 80. It will be appreciated, however, that the compartment 74 may have a single portion or more than two portions in other examples without departing from the scope of the present disclosure.

As provided herein, water-resistant components of the timing device 10 may be disposed within the first portion 76. For example, a reel assembly 204, an encoder assembly 206, and a motorized drive assembly 90 that is coupled to a reel 88 of the reel assembly 204 may be disposed in the first portion 76. The controller 62 and/or the power source 136 may be disposed within the second portion 78.

The elongated member 50 may be wound around the reel 88. As the user 54 (FIG. 5) moves further from the timing device housing 58 with the elongated member 50 attached to them, the elongated member 50 may extend from the reel 88 and/or from the timing device housing 58 through an aperture 146 in the timing device housing 58 in an extension direction (which may be generally offset and/or aligned with any of the X-direction, the Y-direction, and/or the Z-direction). As the elongated member 50 is unreeled from the spool 102 of the reel 88, the elongated member 50 may pass through the encoder assembly 206. The elongated member 50 then exits the timing device 10 through an aperture 146 defined by the timing device housing 58. The encoder 60 may be within the encoder assembly 206 and configured to determine a length of the elongated member 50 that is extended from the timing device 10 as the elongated member 50 is unreeled from the spool 102 and/or that is retracted into the timing device 10 as the elongated member 50 is rewound about the spool 102.

As generally illustrated in FIGS. 16-19, a panel 208 may be positioned above the compartment 74. The panel 208 may define one or more openings 210 therein such that various components may be positioned at least partially within the panel 208. However, it will be appreciated that any component may be otherwise supported by the panel 208 without departing from the scope of the present disclosure. In the illustrated examples, the panel 208 may define a plurality of openings 210 through which respective input devices 212 may be inserted. In various examples, the input devices 212 may correspond to the one or more switches 114a, 114b, 114c described above (or any other switch). In addition, the input devices 212 may be in the form of keypads, touchpads, knobs, buttons, sliders, switches, mice, microphones, and/or the like, which are configured to receive user inputs from the operator. Further, in various examples, additional input devices 212 may be operable coupled with the timing device 10 through one or more ports (e.g., universal serial bus or any other port) that may be positioned within the panel 208, and/or in any other location of the timing device 10.

Additionally or alternatively, the panel 208 may also define an aperture 214. As illustrated, a display 216, which may correspond to the display 116 described above, may be positioned at least partially within the aperture 214. However, it will be appreciated that the display 216 may be otherwise supported by the panel 208 without departing from the scope of the present disclosure. In various examples, the display 216 may be configured as any practicable type of electronic device or part of a device that presents information in visual form. For instance, the display 216 may be configured as cathode ray tube display (CRT), a light-emitting diode display (LED), a electroluminescent display (ELD), an electronic paper, E Ink, a plasma display panel (PDP), a liquid crystal display (LCD), a high-performance addressing display (HPA), a thin-film transistor display (TFT), an organic light-emitting diode display (OLED), a Digital Light Processing display (DLP), a surface-conduction electron-emitter display (SED), a field emission display (FED), a laser display, carbon nanotubes, a quantum dot display (QLED), an interferometric modulator display (IMOD), a digital microshutter display (DMS), a microLED, three-dimensional display, a holographic display, and/or any other type of display. In some examples, the display 216 may include a user input device 212 in the form of circuitry 224 to receive an input corresponding with a location over the display 216. In various examples, the display 216 may be removable from the timing device 10. With the display 216 removed, any of the features described herein may continue to be operable through wired or wireless communication with the timing device 10.

As illustrated, the display 216 may additionally or alternatively be positioned within the lid 202 of the timing device 10. In instances in which the timing device 10 includes a display 216 within the lid 202, the display 216 may be oriented such that the display 216 is visible when the lid 202 is in an open position and/or the display 216 may be oriented such that the display 216 is visible from the outside of the timing device 10. In some cases, the display 216 may face in two separate directions. In such instances, the same information or different information may be provided on a first side 217 of the display 216 from a second side 219 of the display 216. In some cases, the first side 217 of the display 216 may provide an operator with a first set of information while the second side 219 of the display provides a second set of information to the user 54 of the timing device 10.

As illustrated, a frame 218 may be positioned along a peripheral portion of the display 216 on a first side of the panel 208. In some examples, a protector 220 may be positioned between the frame 218 and the display 216 and generally cover the bounded area of the frame 218 thereby protecting a first side portion of the display 216. In addition, a seal 222 may be positioned between the frame 218 and the protector 220 such that water is generally prevented from passing through a joint defined between the frame 218 and the protector 220. Additionally or alternatively, the seal 222 may be positioned between the protector 220 and the display 216. Additionally or alternatively, the seal 222 may be positioned between the frame 218 and the display 216, which may occur in instances in which the timing device 10 is free of the protector 220.

A casing 226 may be positioned on an opposing side of the panel 208 from the frame 218 and at least partially encapsulating a portion of the display 216 between the casing 226 and the panel 208. In some instances, a seal 228 may be positioned between the casing 226 and the panel 208 such that water is generally prevented from passing through a joint defined between the casing 226 and the panel 208.

Various components of the first portion 76 of the compartment 74 may be operably coupled with a first support plate 230. For instance, the reel assembly 204, the encoder assembly 206, and/or a speaker 232, which may correspond to speaker 96 described above, may be operably coupled with the first support plate 230. Likewise, various components of the second portion 78 may be operably coupled with a second support plate 234. For instance, the controller 62 and/or the power source 136 may be operably coupled with the second support plate 234.

The divider 80 may be positioned between the first support plate 230 and the second support plate 234. In various examples, the divider 80 may be formed separately from the first support and/or the second support. However, in other embodiments, the divider 80 may be integrally formed with one or both of the first support plate 230 and/or the second support plate 234. As illustrated, in some examples, a first connector 236 may be positioned on a first side of the divider 80 that allows for electrical connection of components within the first portion 76 of the compartment 74 thereto. A second connector 238 may be positioned on a second side of the divider 80 that allows for electrical connection of components within the second portion 78 of the compartment 74 thereto. As such, electrical connections may be formed between the components within the first portion 76 of the compartment 74 and components within the second portion 78 of the compartment 74 when respectively coupled with the first and second connectors 236, 238. In some instances, the divider 80 may further define a notch 240 along an upper portion thereof that allows for the casing 226 to be at least partially positioned therein.

In some examples, one or more braces may operably couple the divider 80 to the timing device housing 58. For instance, in the examples illustrated in FIGS. 16-20, a first brace may operably couple a first side portion of the divider 80 to the timing device housing 58, and a second brace may operably couple a second side portion of the divider 80 to the timing device housing 58. In the illustrated examples, each of the first brace and the second brace are positioned within the second portion 78 of the compartment 74 and are coupled with the timing device housing 58 and the divider 80 through one or more fasteners. Alternatively, the first brace and the second brace may be otherwise coupled with the timing device housing 58 and the divider 80 (or any other component of the timing device 10). In some examples, the first brace and the second brace may be integrally formed with the divider 80 and/or the timing device housing 58.

As provided herein, the timing device 10 includes the elongated member 50 that may be attached to a user 54. The elongated member 50 may be in the form of a string, fish line, band, tube, cord, and/or any other material that may be disposed around a spool 102 of a reel assembly 204. Moreover, the elongated member 50 may be substantially inelastic in some examples. In alternate examples, the elongated member 50 may be elastic. In some instances, the elongated member 50 may be coupled with a harness 242, which may be configured as a belt 53 (FIG. 1) or any other attachment device that may be coupled to the elongated member 50. In some instances, a swivel assembly 244 may be disposed between the elongated member 50 and the harness 242 for releasably coupling the harness 242 to the elongated member 50. In various examples, the swivel assembly 244 may be configured to release the belt from the elongated member 50 when a predefined amount of force is placed on the elongated member 50. For example, the swivel assembly 244 may have first and second coupling portions 246, 248. Accordingly, the swivel assembly 244 may assist in preventing the timing device 10 from being pulled from in its initial and/or into a pool due to excessive force by separating the first coupling portion 246 from the second coupling portion 248 when the predefined amount of force is provided on the swivel assembly 244.

In some instances, the predefined amount of force may be adjustable through the swivel assembly 244 based on the amount of resistance provided from the timing device 10 and/or may be adjusted by an adjustment device. In various examples, the adjustment may be made through various features integrated within the first coupling portion 246 and/or the second coupling portion 248 that allows for an amount of separating force to be altered. For instance, the first and second coupling portions 246, 248 may include moveable (or otherwise adjustable) magnets. In some instances, as additional magnets are positioned along the contact portions, the predefined amount of force may be increased. Additionally or alternatively, any other attachment device may be positioned along the first and second coupling portions 246, 248 to adjust the predefined amount of force.

Additionally or alternatively, in various instances, the first and second coupling portions 246, 248 may be uncoupled by the timing device 10 based on various events. In such instances, the first and second coupling portions 246, 248 may be any type of couplings that may be connected and/or disconnected through actuation by the controller 62. For example, the first coupling portion 246 (or the second coupling portion 248) may include an electromagnet that provides a first magnetic field in a first state and a second magnetic field in a second state in which the second magnetic field has a strength that is varied from a strength of the first magnetic field. In various examples, the first and second coupling portions 246, 248 may be actuated through wired and/or wireless communication. In addition, the event that causes the first and second coupling portions 246, 248 to disconnect may be the elongated member 50 extending a predefined distance, the timing device 10 experiencing a torque exceeding a defined threshold, the timing device 10 detecting movement of the housing 58 beyond a defined threshold, and/or any other event.

In some instances, the timing device housing 58 may further include feet 250 that are configured to support the timing device housing 58 of the timing device 10 on a support surface. The feet 250 may be composed of any practicable material and may be adjustable in height. In some instances, the housing 58 may define mounting holes 251. The feet 250 may include a base portion 253 and a support 255. The support 255 may be operably coupled with the mounting holes 251 of the housing 58 and allow for adjustment in height of the base portion 253.

In some instances, a coefficient of friction of the feet 250 may be accounted for when determining the predefined amount of force to separate the first and second coupling portions 246, 248 of the harness 242. For example, a maximum possible friction force between two surfaces before sliding begins is the product of the coefficient of static friction and the normal force represented by the following equation:

$$F_{max} = \mu_s F_n, \quad (1)$$

where $\mu_s$ is the coefficient of static friction and $F_n$ is the normal force exerted by the timing device 10 and the support surface on each other, directed perpendicular (normal) to the support surface. In some examples, $F_{max}$ may be greater than the predefined amount of force to separate the first and second coupling portions 246, 248 of the harness 242 thereby preventing the timing machine from being slid along the support surface and potentially into the pool.

Figure 20:
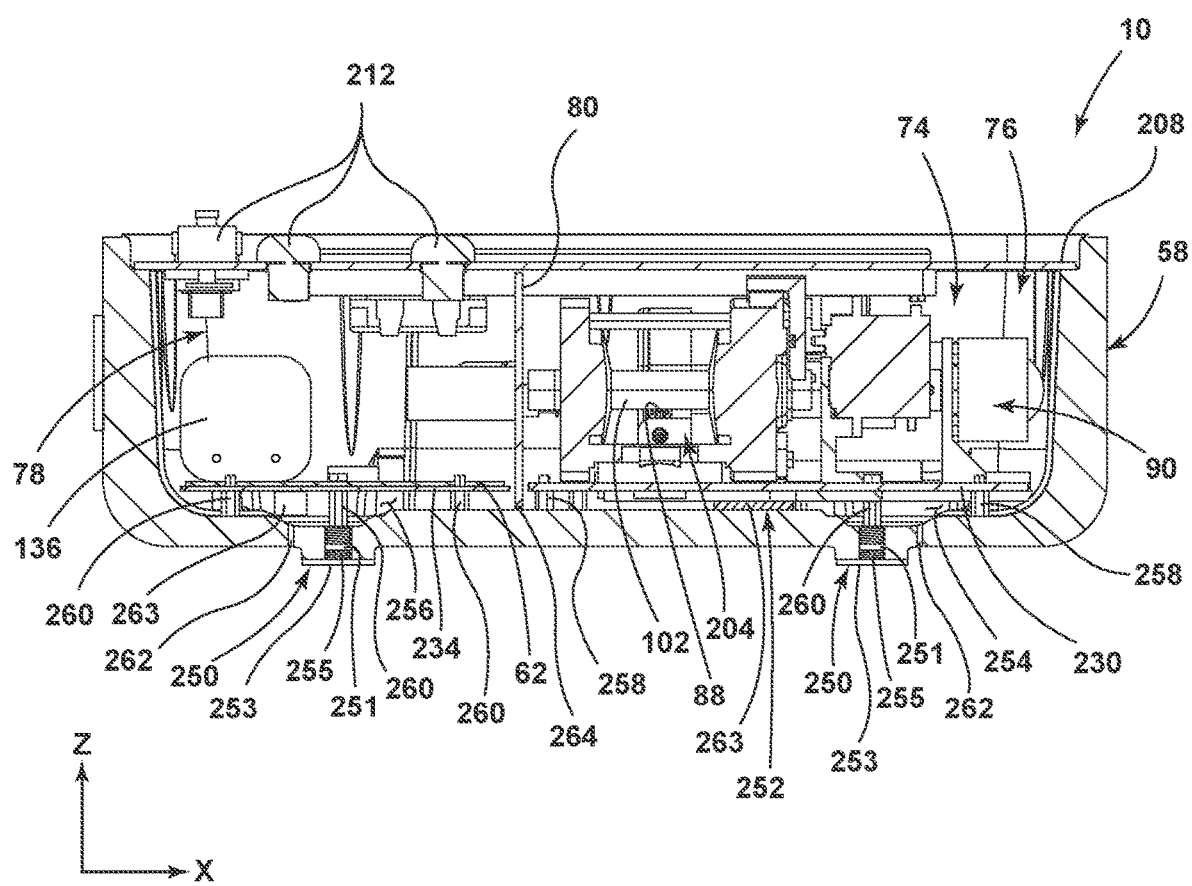
FIG. 20 is a cross-sectional view of the timing device taken along the line XX-XX of FIG. 18.

Referring further to FIG. 20, as provided herein, various components of the first portion 76 of the compartment 74 may be operably coupled with a first support plate 230. For instance, the reel assembly 204, the encoder assembly 206, and/or a speaker 232 may be operably coupled with the first support plate 230. Likewise, various components of the second portion 78 may be operably coupled with a second support plate 234. For instance, the controller 62 and/or the power source 136 may be operably coupled with the second support plate 234. Each of the first support plate 230 and the second support plate 234 may be vertically offset in the Z-direction from a bottom portion 252 of the timing device housing 58 defining respective gaps therebetween. In some examples, a first gap 254 may be defined between the first support plate 230 and the timing device housing 58 that is generally equal in a Z-direction to a second gap 256 defined between the second support plate 234 and the timing device housing 58. Alternatively, the first gap 254 may be varied from the second gap 256 in the Z-direction.

In the illustrated example, the first support plate 230 is operably coupled with upper portions of a first set of standoffs 258. Further, lower portions of the first set of standoffs 258 may be operably with the timing device housing 58. Likewise, the second plate is operably coupled with upper portions of a second set of standoffs 260. Further, lower portions of the second set of standoffs 260 may be operably with the timing device housing 58. Additionally, the first set of standoffs 258 and/or the second set of standoffs 260 may be adjustable such that the first gap 254 and/or the second gap 256 may be altered. The first set of standoffs 258 and/or the second set of standoffs 260 may be operably coupled with the mounting holes. In addition, the feet 250 may be operably coupled with the mounting holes on an opposing side of the housing 58 from the first set of standoffs 258 and/or the second set of standoffs 260.

In some examples, one or more drains 262 may be defined by or otherwise couple with the timing device housing 58. As such, in operation, if water or any other liquid, enters the first portion 76 and/or the second portion 78 of the compartment 74, the water may be directed out of the timing device housing 58 through the one or more drains 262. In several instances, the timing device may further include one or more water removal devices 263, which may be positioned within the first portion 76 and/or the second portion 78 of the compartment 74. The water removal device may be any assembly capable of further removing liquids from the compartment 74, which may be actuated after a timing sequence has been completed when a threshold amount of water is detected within the first portion 76 and/or the second portion 78 of the compartment 74. In various examples, the water removal device 263 may be a fan, a heater, a dryer, a bilge pump, any other pump, and/or any other assembly.

With further reference to FIG. 20, in some instances, the divider 80 may extend vertically above and/or vertically below the first support plate 230 and/or the second support plate 234. In addition, a seal 264 may be positioned between a bottom portion of the divider 80 and the timing device housing 58. As such, any liquid within the first portion 76 of the compartment 74 may be generally maintained within the first portion 76 and any liquid within the second portion 78 of the compartment 74 may be maintained with the second portion 78.

Figure 21:
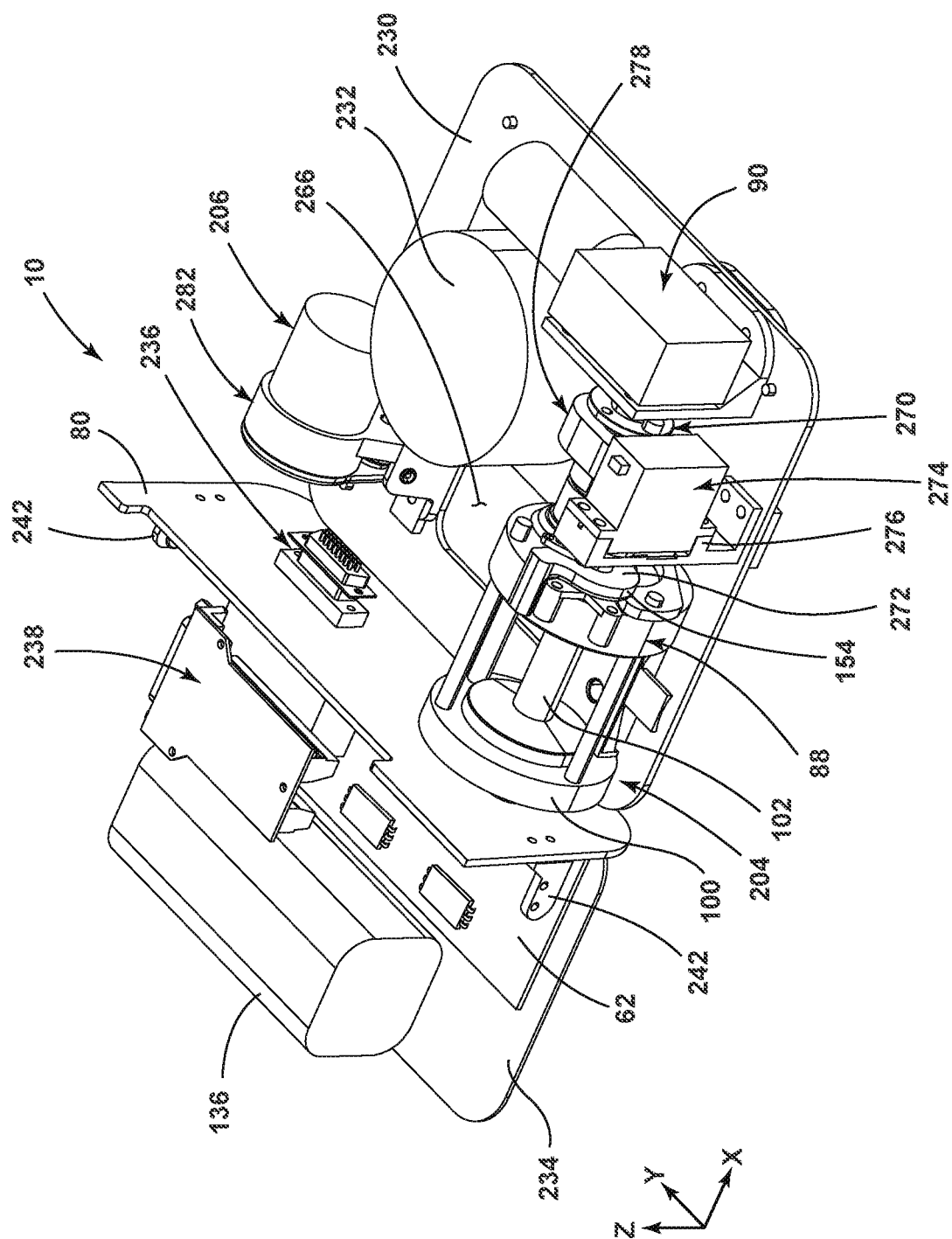
FIG. 21 is a top perspective view of various components of the timing device, according to some examples.
Figure 22:
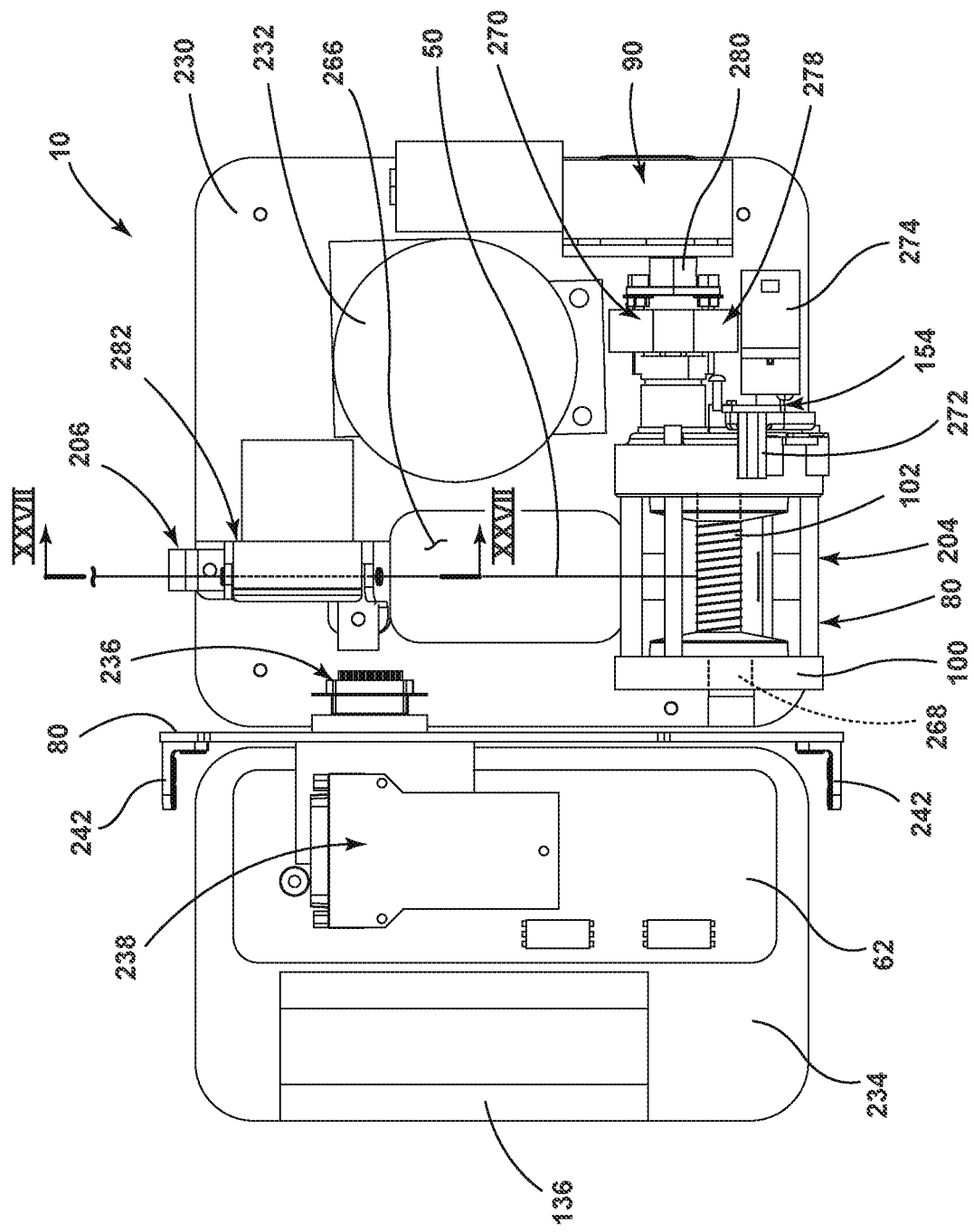
FIG. 22 is a top plan view of various components of the timing device, according to some examples.
Figure 23:
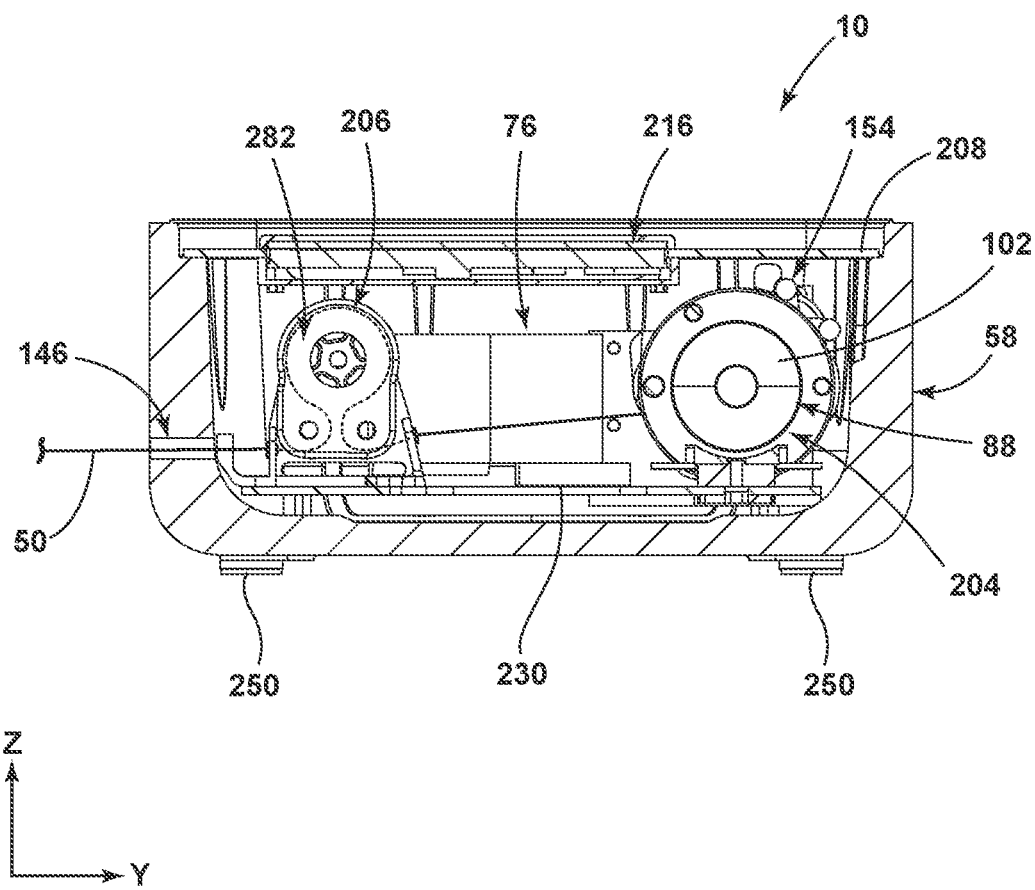
FIG. 23 is a cross-sectional view of the timing device taken along the line XXIII-XXIII of FIG. 18.
Figure 24:
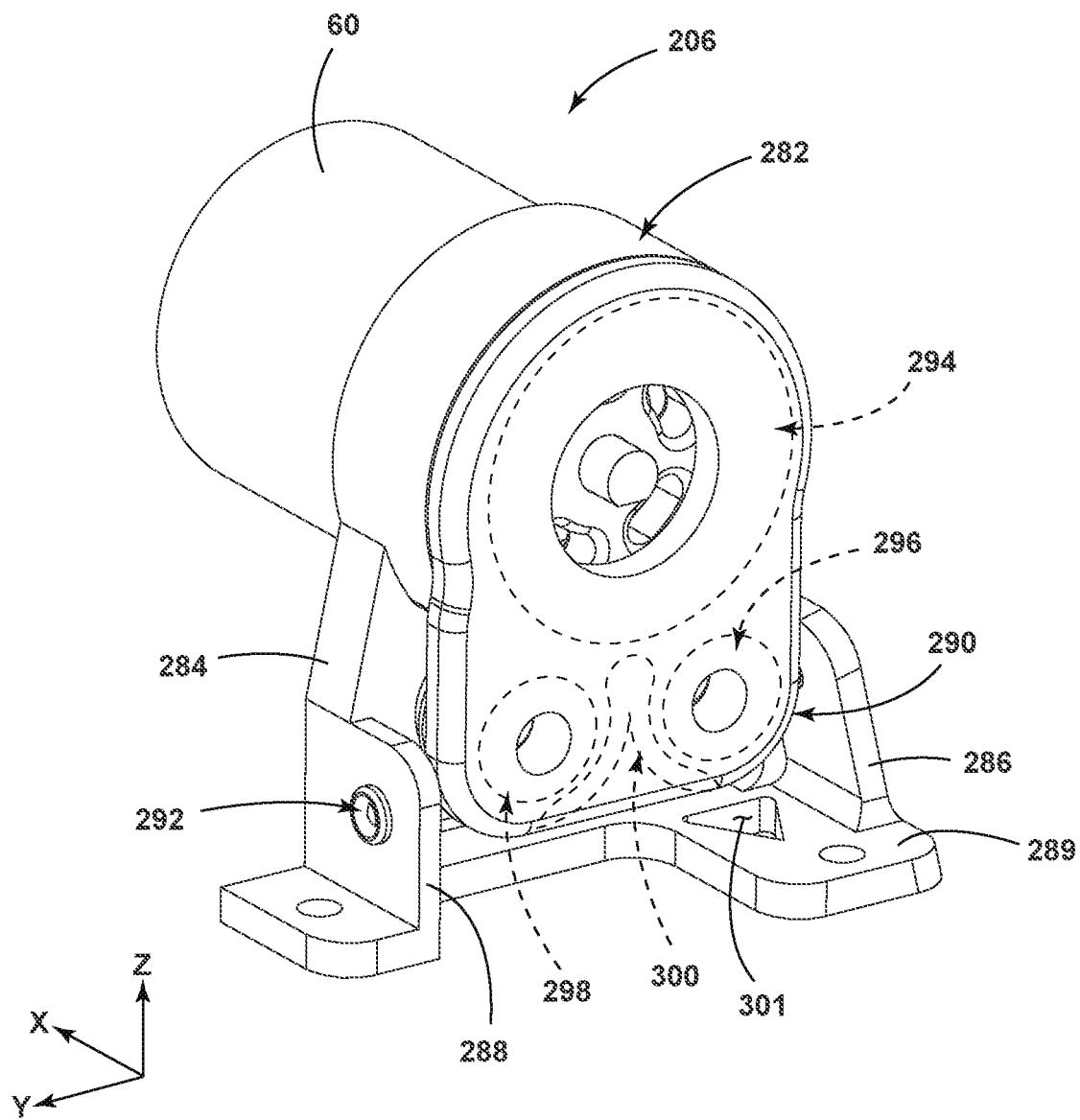
FIG. 24 is a side perspective view of an encoder assembly within the timing device, according to some examples.
Figures 25, 26:
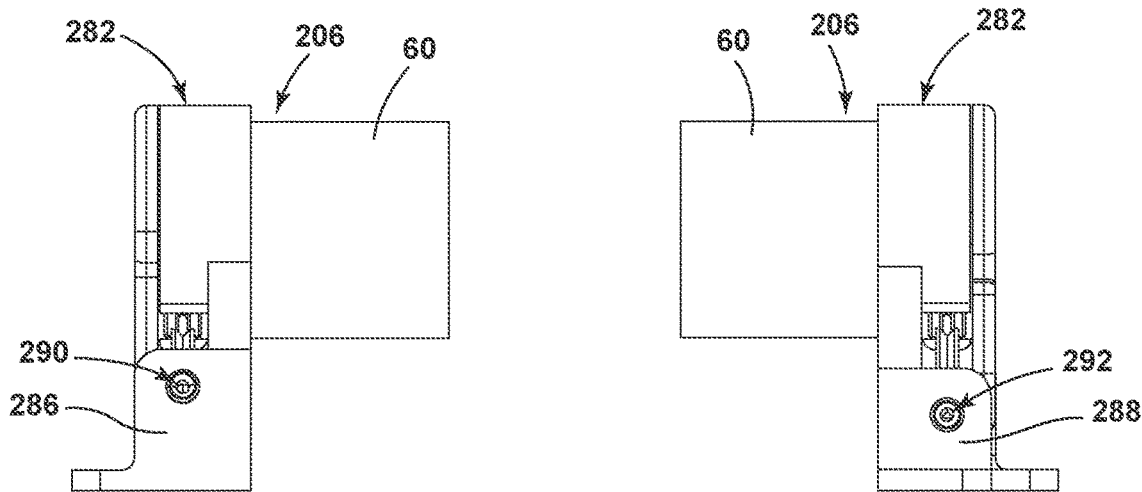
FIG. 25 is a first side plan view of the encoder assembly within the timing device, according to some examples.
FIG. 26 is a second side plan view of the encoder assembly within the timing device, according to some examples.
Figure 27:
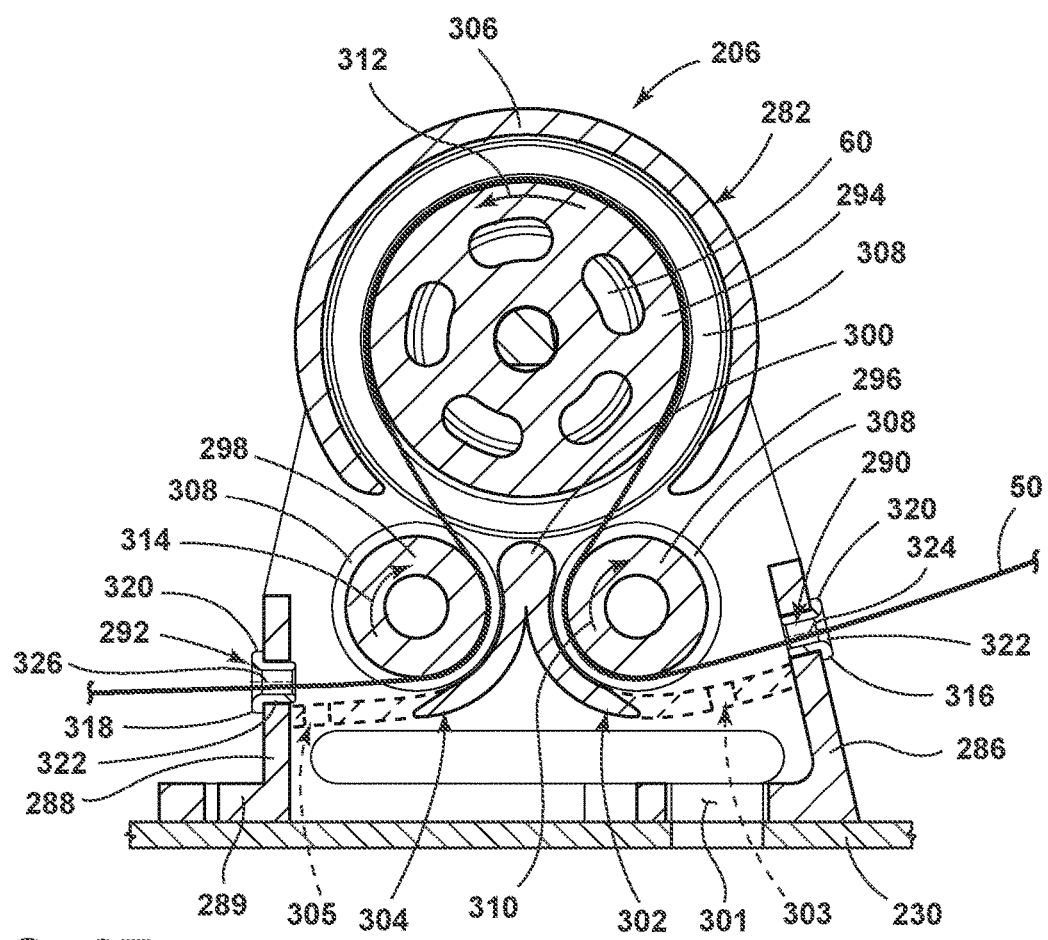
FIG. 27 is a cross-sectional view of the timing device taken along the line XXVII-XXVII of FIG. 22.
Figure 28:
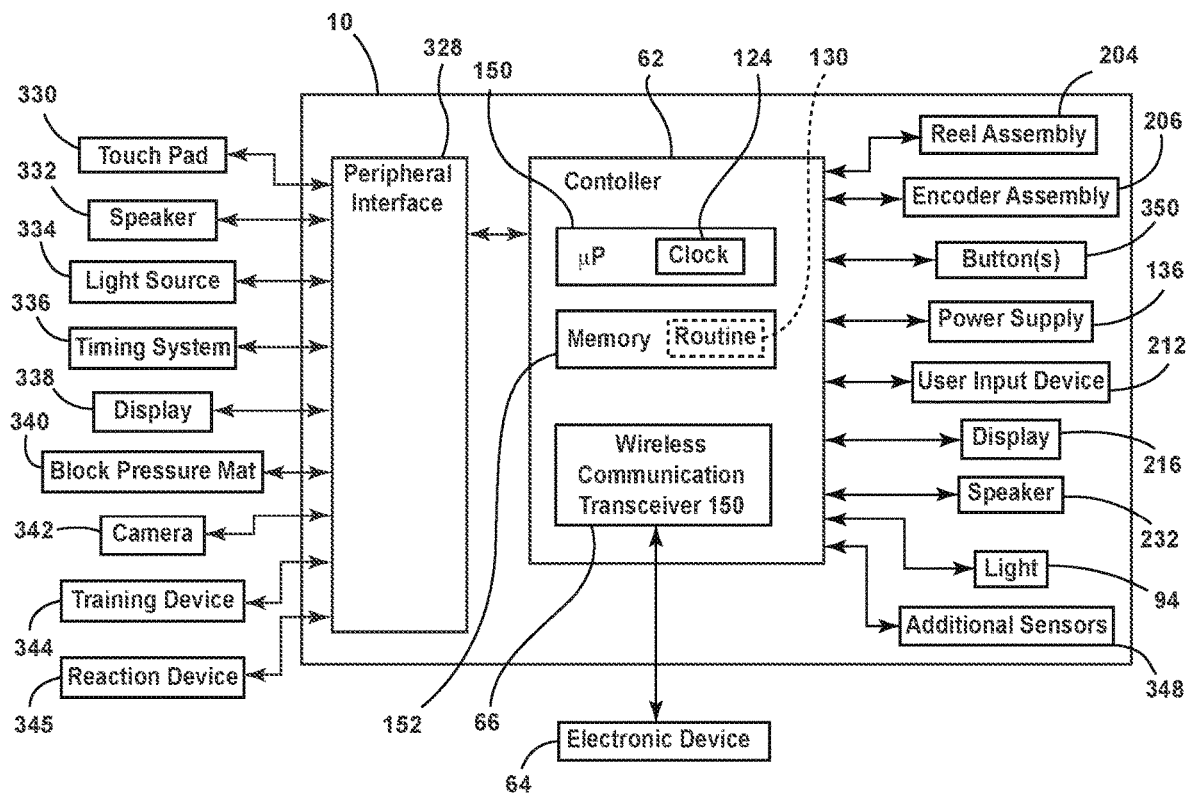
FIG. 28 is a block diagram of the timing device communicatively coupled with one or more peripheral devices, according to some examples.

Referring now to FIGS. 21 and 22, as provided herein, a reel assembly 204, an encoder assembly 206, and/or a speaker 232 may be positioned within the first portion 76 of the compartment 74. As illustrated, each of the reel assembly 204, the encoder assembly 206, and the speaker 232 may be operably coupled with the first support plate 230.

In the examples illustrated in FIGS. 21 and 22, the first support plate 230 defines a void 266 between the encoder assembly 206 and the reel assembly 204. In operation, as the elongated member 50 is returned to the reel assembly 204, water may be present on the elongated water. At least some of the water on the elongated member 50 may drain into the first gap 254 through the void 266. In turn, the water may be removed from the timing device housing 58 through one or more drains 262.

In some examples, such as those illustrated in FIGS. 21 and 22, the reel assembly 204 may include a main body 100 and a spool 102 that is rotatably mounted to main body 100 via a spool axle 268. The reel assembly 204 can further include a clutch that may be placed in a first, disengaged position allowing for free movement of the spool 102 in a first direction, which allows the elongated member 50 to extend from the reel assembly 204, and a second, engaged position that locks the spool 102 relative to a winding assembly 270 in a second direction, which allows the elongated member 50 to return the reel assembly 204. In various examples, the clutch may include a lever 272 that allows for actuation between the first position and the second position.

In some instances, the lever 272 may be operably coupled or otherwise interact with an actuator 274 with the actuator 274 being configured to move the lever 272 into at least one of the first position and/or the second position. The actuator 274 may be in the form of a rotary actuator, a linear actuator, and/or any other practicable type of actuator. In the illustrated examples, the actuator 274 may be operably coupled with an actuator bracket 276. As illustrated, the actuator bracket 276 is further operably coupled with the first support plate 230.

With further reference to FIGS. 21 and 22, an adapter 278 is operably coupled with the winding assembly 270 and an output shaft 280 of the motorized drive assembly 90. The motorized drive assembly 90 is configured to transfer power to the spool 102. In various examples, the motorized drive assembly 90 may include an AC brushless motor, DC brushed motor, DC brushless motor, direct-drive motor, linear motor, servo motor, a stepper motor, and/or any other practicable device. In use, when the elongated member 50 is to be unwound from the spool 102, the actuator 274 may place the clutch in the first position thereby decoupling the winding assembly 270 from the spool 102 to allow for relative motion therebetween. When the elongated member 50 is to be wound about the spool 102, the actuator 274 may place the clutch in the second position thereby coupling the winding assembly 270 with the spool 102 such that rotation of the winding assembly 270 causes rotation of the spool 102.

With further reference to FIGS. 21 and 22, in some instances, a speaker 232 may be positioned within the first portion 76 and/or the second portion 78 of the compartment 74. As provided herein, the speaker 232 may be configured to produce audible sounds. The audible sound may provide the commands discussed herein and/or signify a starting time for the user 54 and/or feedback (time, coaching advice, etc.).

Referring further to FIGS. 21-27, in some instances, the encoder assembly 206 may be positioned on an opposing side of the void 266 in the first support plate 230 from the spool 102. The encoder assembly 206 may include an encoder housing 282 that is configured to operably couple with the first support plate 230. In various examples, the encoder housing 282 may include a support panel 284, a first flange 286, a second flange 288, and a base portion 289. The first flange 286 may define an inlet 290 and the second flange 288 may define an outlet 292. In some instances, the inlet 290 is vertically offset from the outlet 292 in a Z-direction. In various instances, the base portion 289 may define one or more openings 301 that form drains. As such, fluids positioned on the elongated member 50 may fall off the elongated member 50, through the one or more openings 301, and into the first gap 254 and/or the second gap 256.

The encoder assembly 206 may further include one or more wheels. For example, in the illustrated examples, the encoder assembly 206 may include a first wheel 294, a second wheel 296, and a third wheel 298. The first wheel 294 may be positioned at least partially above the second wheel 296 and the third wheel 298 in the Z-direction. In some instances, the second wheel 296 may be positioned a lesser distance to the spool 102 than the third wheel 298 in a Y-direction. In various examples, by winding the elongated member 50 about the three wheels 294, 296, 298, the elongated member 50 may be generally tightened as the elongated member 50 is extended from the timing device 10.

In some instances, a guide 300 may be positioned between the second wheel 296 and the third wheel 298 in the Y-direction. The guide 300 may have a first segment 302 that is curved in a first direction and a second segment 304 that is curved in a second direction. The first segment 302 may extend below the first wheel 294 and/or the second wheel 296 in the Z-direction. Similarly, the second segment 304 may also extend below the first wheel 294 and/or the second wheel 296 in the Z-direction. In various examples, a gap between the guide 300 and the second wheel 296 and a gap between the guide 300 and the third wheel 298 may each be less than a width of the elongated member 50.

In some examples, the first segment 302 of the guide 300 may extend to the first flange 286 and the second segment 304 of the guide 300 may extend to the second flange 288. In addition, the first segment 302 may define a first drain 303 and the second segment 304 may define a second drain 305.

In several examples, an extension 306 may be positioned about at least a portion of the first wheel 294. The extension 306 may be configured to retain the elongated member 50 between the two lips 308 of the first wheel 294 and the extension 306. In various examples, a gap between the extension 306 and the first wheel 294 may be less than a width of the elongated member 50.

An encoder 60 may be operably coupled with the one or more wheels. For example, the encoder 60 may be operably coupled with the first wheel 294. In operation, the elongated member 50 may be positioned through the inlet 290 and wound partially about the second wheel 296. From the second wheel 296, the elongated member 50 is positioned at least partially about the first wheel 294. From the first wheel 294, the elongated member 50 is positioned at least partially about the third wheel 298 and directed through the outlet 292. In some instances, the first wheel 294, the second wheel 296, and/or the third wheel 298 may include a pair of lips 308 with the elongated member 50 positioned between the lips 308 to further assist in retaining the elongated member 50 about the various wheels. While the encoder assembly 206 includes three wheels, 294, 296, 298, such as the one illustrated in FIGS. 21-27, the encoder assembly 206 may include any number of wheels without departing the scope of the present disclosure.

When the elongated member 50 is unwound from the spool 102 and extended from the timing device housing 58, the elongated member 50 can rotate the first wheel 294 in a first direction (e.g., a clockwise direction) as illustrated by arrow 310, the second wheel 296 in a second direction that is opposite of first direction (e.g., a counterclockwise direction) as illustrated by arrow 312, and the third wheel 298 in the first direction (e.g., the clockwise direction) as illustrated by arrow 314. However, each wheel may rotate in a different direction as the elongated member 50 is unwound from the spool 102 and extended from the timing device housing 58. With the encoder 60 operably coupled with the first wheel 294, the encoder 60 can measure a number of revolutions of the first wheel 294. Based on the revolutions of the first wheel 294 during a defined time, a length of extension or retraction of the elongated member 50 may be determined. As such, the inlet 290 is upstream of the first wheel 294, the second wheel 296, and/or the third wheel 298 relative to an extension path of the elongated member 50 as the elongated member 50 extends from the timing device 10 and the outlet 292 may be downstream of the first wheel 294, the second wheel 296, and/or the third wheel 298 relative to the extension path of the elongated member 50. As used herein, the "extension path" is a path of movement of the elongated member 50 from the spool 102 through the aperture 146 of the timing device housing 58 as the elongated member 50 is extended from the timing device housing 58. Conversely, a "retraction path" is a path of movement of the elongated member 50 to the spool 102 from the aperture 146 of the timing device housing 58 as the elongated member 50 is retracted into the timing device housing 58.

In some instances, a first eyelet 316 may be positioned within the inlet 290 and a second eyelet 318 may be positioned within the outlet 292. Each of the first eyelet 316 and the second eyelet 318 include a rim portion 320 and a body portion 322. The rim portion 320 of the first eyelet 316 may extend along an outer surface of the first flange 286 and the body portion 322 of the first eyelet 316 may be at least partially positioned within the inlet 290. Likewise, the rim portion 320 of the second eyelet 318 may extend along an outer surface of the second flange 288 and the body portion 322 of the second eyelet 318 may be at least partially positioned within the outlet 292. In various examples, the first eyelet 316 and the second eyelet 318 may be formed from a material having a generally low coefficient of friction (e.g., less than 0.7), such as a ceramic material and/or any other material.

In some instances, the inlet 290 may define a first centerline 324. The first centerline 324 may be positioned a first height above the first support plate 230. In addition, the first centerline 324 may be non-parallel to the first support plate 230. Further, the outlet 292 may define a second centerline 326. The second centerline 326 may be positioned a second height above the first support plate 230. In addition, the second centerline 326 may be generally parallel to the first support plate 230.

It will be appreciated that the timing device 10 may be free of the first support plate 230 and/or the second support plate 234. In such instances, the components described herein may be operably coupled with the timing device housing 58 and/or any other component of the timing device 10 without departing from the scope of the present disclosure. In addition, any of the components described herein may be mirror in various implementations without departing from the teachings provided herein.

Referring now to FIGS. 28-33, the timing device 10 may be operably coupled with a stand 315. The stand 315 may be any assembly that is configured to generally maintain a position of the timing device 10. The stand may be vertically and/or angularly adjustable.

With further reference to FIGS. 28-33, as provided herein, the timing device 10 can include a controller 62, which may be configured as any suitable processor-based device(s), such as a computing device or any combination of computing devices. As such, the controller 62 may include one or more processor(s) 126 and associated memory device(s) 128 configured to perform a variety of computer-implemented functions. As provided herein, a clock 124 can be disposed in the processor 126, or any other timer or counter may otherwise be disposed within the controller 62.

Figure 29:
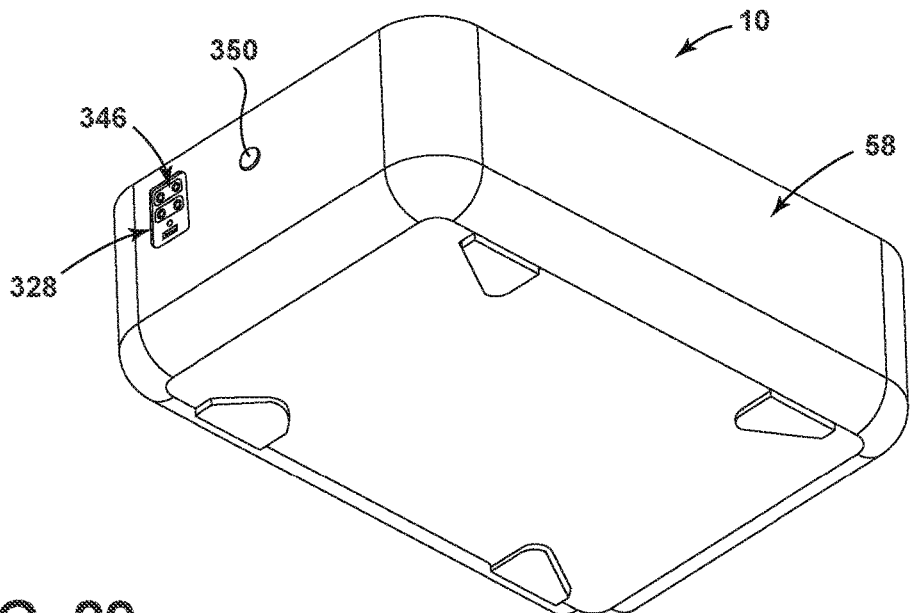
FIG. 29 is a bottom perspective view of an encoder assembly within the timing device, according to some examples.
Figure 30:
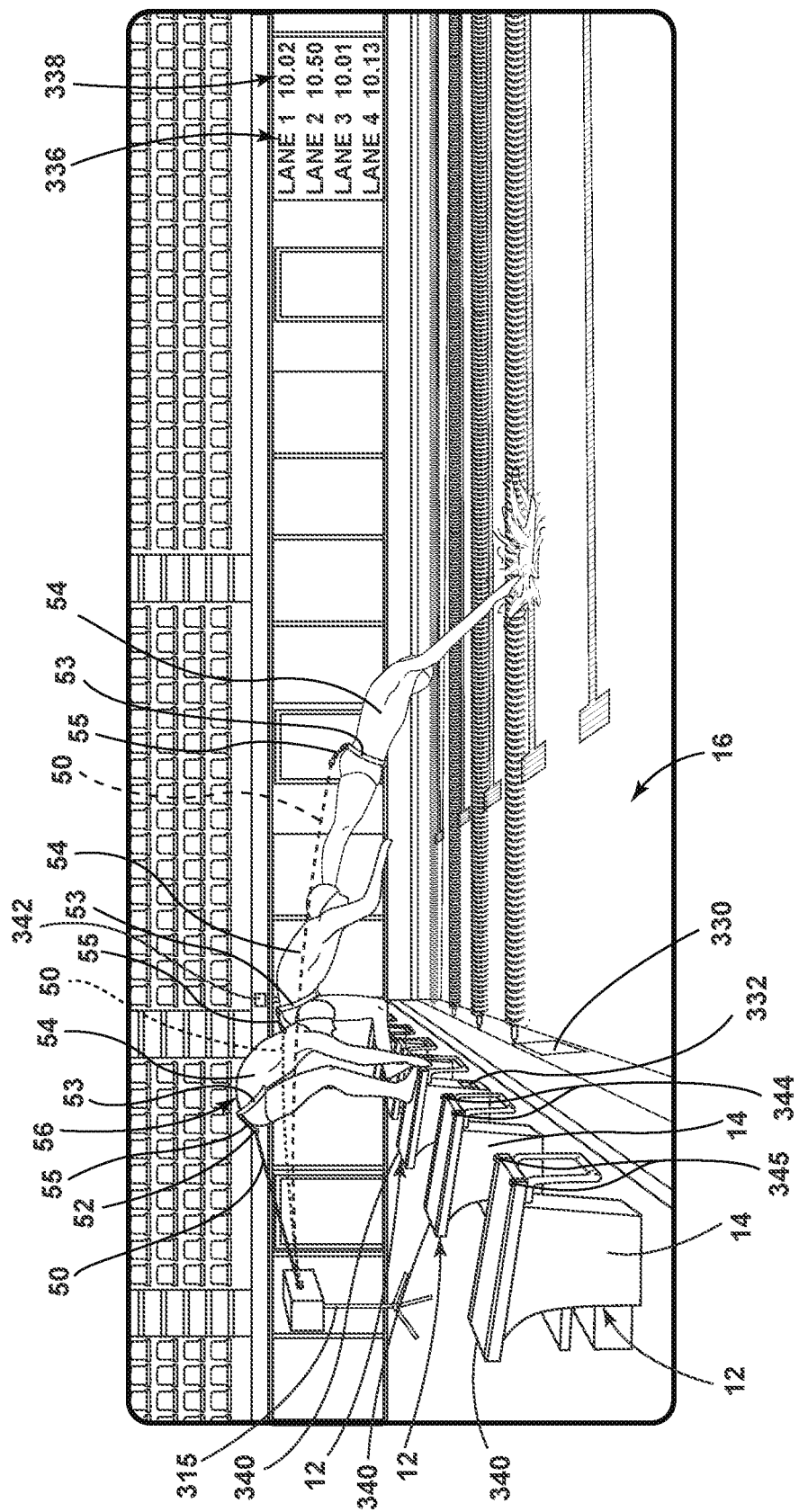
FIG. 30 is a side perspective view of a user utilizing the timing device, according to some examples.

In addition, the timing device 10 may further include a peripheral interface 328 that may be used to couple one or more peripheral devices to the timing device 10. For example, the peripheral devices may include a swimming touchpad 330, a speaker 332 (which may be an externally located and/or internally located horn), a light source 334 (which may flash to indicate initiation of the timing sequence), an athletic timing system 336, a remote display 338, a block pressure mat 340 (which may be placed on an upper surface of a starting block 12), a camera 342 (which may allow for video integration with the captured images being above and/or below the water line and may be internal and/or external to the timing device 10), a training device 344, a reaction device 345, etc. As illustrated in FIG. 29, the peripheral interface 328 may include various ports 346 based on the plugs of the peripheral devices. For example, a touchpad 330 may include banana plugs that are coupled with a first port of the peripheral interface 328 while the remote display 338 may be coupled with a second port of the peripheral interface 328. Moreover, as provided herein, any other the peripheral devices may additionally or alternatively be wirelessly coupled with the timing device 10 through the transceiver 66. In various examples, the peripheral interface 328 may also be capable of charging one or more electronic devices 64 and/or power any of the peripheral devices.

In some cases, multiple swimming touchpads 330, speakers 332, light sources 334, athletic timing systems 336, remote displays 338, block pressure mats 340, cameras 342, training devices 344, and/or reaction devices 345 may be coupled with a single timing device 10. In such instances, the timing device 10 may be capable of orienting and locating each component such that a defined set of components may be grouped with one another. In addition, a timing sequence may be accomplished through each group, which may occur while other groups of components are also in use. For instance, a first user 54 may be assigned to a first group of components that includes a first touchpad 330, a first speaker 332, a first light source 334, and/or a first reaction device 345 while a second user 54 may be assigned to a second group of components that includes a second touchpad 330, a second speaker 332, a second light source 334, and/or a second reaction device 345. The first and second group of components may be used simultaneously or at varied times and be capable of storing the timing sequences individually.

In some instances, the reaction device may be an external device that is configured to measure a reaction time of a user 54. For instance, the reaction device may include one or more proximity sensors (e.g., LIDAR, RADAR, camera, etc.), a movement sensor, a resistive pad, a transmitter/receiver device, and/or any other practicable device.

In some examples, various sequences may be chosen based on the peripheral devices coupled with the timing device 10. For instance, as the "relay" timing sequence is initiated by contact with the touchpad 330, the mode may be chosen when a touchpad 330 is operably coupled with the timing device 10. It will be appreciated, however, that, in some instances, more than one touchpad 330 may be operably coupled with the timing device 10.

The memory device(s) 128 may generally be configured to store suitable computer-readable instructions that, when implemented by the processor(s) 126, configure the one or more remote computing systems to perform various computer-implemented functions. It should be appreciated that the one or more remote computing systems may also include various other suitable components, such as a communications circuit or module, a network interface, one or more input/output channels, a data/control bus, and/or the like.

One or more routines 130 are stored in the memory 128 and may be executed by the processor 126, as described herein, before, during, and/or after a timing sequence, which may be a time from initiation of a clock 124 of the timing device 10 until the elongated member 50 is extended a predefined distance $d_F$ (FIG. 5) from the timing device 10. For instance, a routine 130 may process signals from the encoder 60, the motorized drive assembly 90, the reel 88, and/or the one or more peripheral devices to calculate various performance characteristics of a user 54. For example, the routine 130 may provide data that can be used to determine the acceleration of a user 54, instantaneous velocity of the user 54, time to complete the predefined distance $d_F$, a reaction time, a distance jumped, splits at predefined distances, distances covered during predefined time intervals, a maximum velocity, a minimum velocity, an average velocity, a maximum acceleration/deceleration, a maximum jerk, a minimum jerk, an average jerk, a maximum power, a minimum power, an average power, a minimum acceleration/deceleration, an average acceleration/deceleration, and/or any other data.

In various examples, prior to starting a timing sequence, a calibration routine 130 may be completed in order to calibrate a length of the elongated member 50 extending an initial distance from the timing device 10. In such instances, the elongated member 50 may be connected to a user. In addition, the timing device housing 58 may be placed in a defined location with the defined location being a position of the timing device 10 while the timing device 10 is in use. With the timing device 10 in the defined location, the user may stand at a forward portion of the starting location. For instance, a swimmer may stand at the front portion of the starting block 12 (i.e., the portion of the starting block 12 closer to the water). With the user at the forward portion of the starting location, a retraction of the elongated member 50 may be performed in which the elongated member 50 is rewound about the spool 102 until a defined tension is accomplished. At that time, the calibration sequence may be completed with the elongated member 50 extending an initial distance $d_0$ from the timing device housing 58. In operation, after each timing sequence, the elongated member 50 may rewind about the spool 102 until the elongated member 50 extends the initial distance $d_0$ from the timing device housing 58.

In some instances, a set distance may be defined when a calculated reaction time routine 130 is to be determined. The set distance may be generally equal to a distance that the elongated member 50 will extend prior to the user 54 being separated from the starting block 12. As such, the set distance may be a generalized distance (e.g., 0.8 meters, 1 meter, etc.) and/or measured and altered within the timing device 10 for an individual user. During the timing sequence, as the elongated member 50 is extended from the timing device housing 58 from the initial distance $d_0$ to the predefined distance $d_F$, a swim time is may be defined by the following equation:

$$t_s = t_{d_F} - t_{sd}, \qquad (2)$$

where $t_{d_F}$ is the time to reach the predefined distance $d_F$ from the initial distance $d_0$ and $t_{sd}$ is the time for the elongated member 50 to extend from the initial distance $d_0$ to the set distance. Further, a calculated reaction time may be represented by the time from the initial distance $d_0$ to the set distance.

In several examples, the routines 130 may additionally or alternatively include one or more comparison routines 130. For example, the comparison routine 130 may compare a just completed timing sequence to the user's other repetitions during a common training session, the user's repetitions during another training session, and/or to other users of the training device. As used herein, a "repetition" is any movement that is repeated and monitored by the timing device 10 for analysis as to each individual repetition and/or to other repetitions. Additionally or alternatively, the comparison routine 130 may compare the performance of one user to others to determine whether the user is above average/average/below average. In some instances, through the user interface 92, the remote electronic device 64, or any other device, the comparative data may be set based on a user's sex, age, ability level, etc.

With further reference to FIGS. 28-33, the one or more routines 130 may further include a feedback routine 130 in which the timing device 10 is configured to provide feedback based on the user's time and/or other measured metrics during the timing sequence. For example, if a portion of the user's performance varies from a defined target (target time, target comparative user, etc.), the system may provide analysis and/or other feedback that the user may use to improve their performance.

Figure 31:
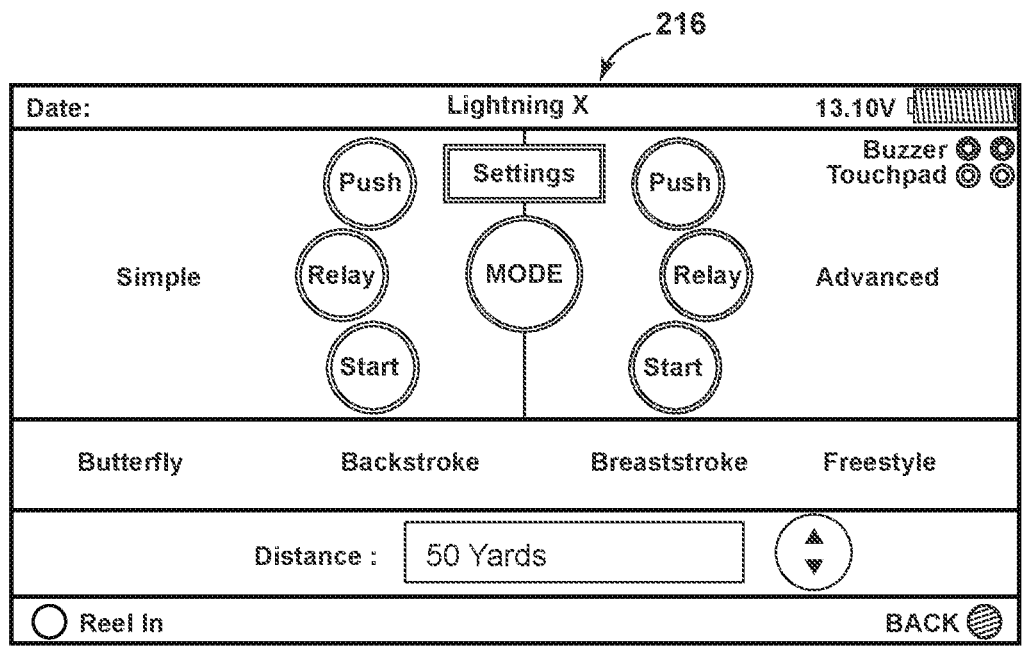
FIG. 31 is an example illustration of information provided on a display of the timing device, according to some examples.

As illustrated in FIG. 31, one or more timing sequences may be chosen through the user interface 92 and/or the display 216, according to some implementations. For example, the user interface 92 and/or the display 216 may be used to choose a "push" timing sequence, a "relay" timing sequence, a "start" timing sequence, a "race" timing sequence, a "turn" timing sequence, etc. In the "push" timing sequence, the user 54 may be positioned within the water at the initiation of the timing sequence. In the "relay" timing sequence, a timing sequence may be initiated when a person touches a touchpad 330 within the water. In turn, the user 54 may jump off a block 12 and continue until the predefined distance $d_F$ has been reached. During "relay" timing sequence, a reaction time may be calculated as the time between the contact with the touch pad and the time for the elongated member 50 to extend the set distance. In the "start" timing sequence, the user 54 may be positioned in a starting location (e.g., in contact with a block 12) with the timing sequence initiating with a sound, a light flash, etc. In the "race" timing sequence, the user 54 may be positioned in a starting position and the timing sequence may be completed when contact with a touchpad 330 occurs. In the "turn" timing sequence, a turn time may be initiated when contact is made with a touchpad 330 (FIG. 30) and ends when the elongated member 50 is extended a defined distance from the housing 58. The defined distance may be generally equal to the distance the timing device 10 is positioned from the side of the pool plus the height above the ground of the belt 54 when the belt 54 is attached to the user 54 (possibly with the user 54 standing on their toes).

The timing device 10 may additionally or alternatively be configured to perform a hybrid timing sequence in which various timing sequences may be combined. Additionally or alternatively, the timing device 10 may also be configured to perform a timing sequence that utilizes information from a network/cloud 354 (FIG. 33) and/or the memory 128 of the controller 62. The information may include historical data related to a common user 54, another person, and/or any other source. Additionally or alternatively, the timing device 10 may be configured to calculate an optimized time in which various portions of timing sequences can be combined to illustrate a target scenario.

In some instances, the timing sequence may extend beyond the length of the pool. As such, the timing sequence may measure splits at predefined distances, distances covered during predefined time intervals, a maximum velocity, a minimum velocity, an average velocity, a maximum acceleration/deceleration, a minimum acceleration/deceleration, an average acceleration/deceleration, a maximum jerk, a minimum jerk, an average jerk, a maximum power, a minimum power, an average power, and/or any other data as the user 54 moves away from the timing device 10 and towards the timing device 10. As the user 54 moves towards the timing device 10, the elongated member 50 may be tensioned within a predefined range by the motorized drive assembly 90. In some instances, the motorized drive assembly 90 may begin to tension the elongated member 50 when the elongated member extension from the housing 58 falls below a default extension velocity, which may indicate that the user 54 is turning.

Figure 32:
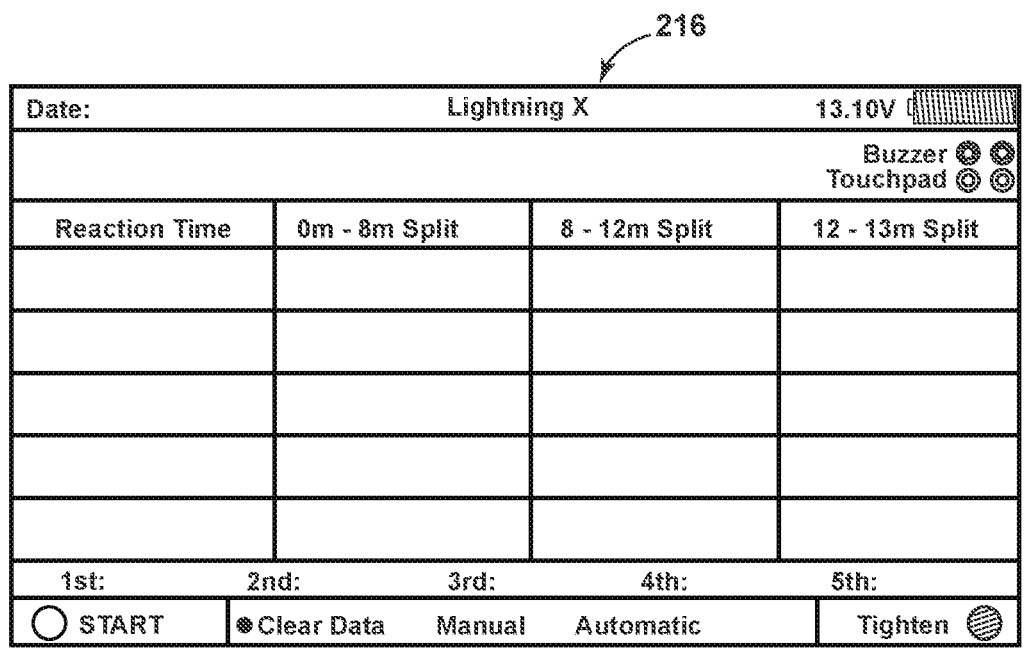
FIG. 32 is an example illustration of information provided on the display of the timing device, according to some examples.
Figure 33:
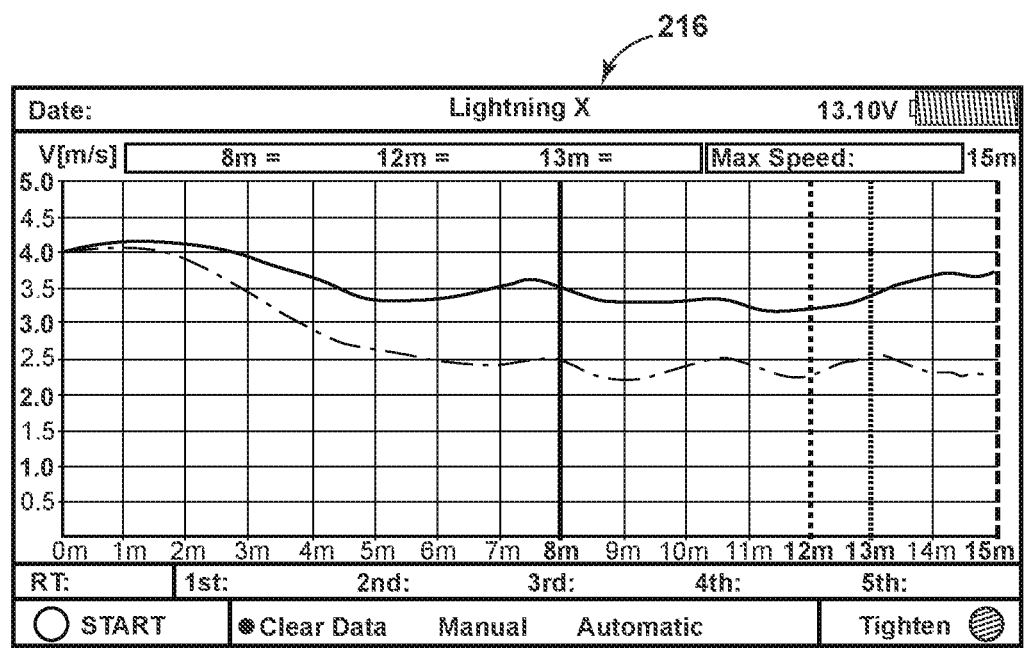
FIG. 33 is an example illustration of information provided on the display of the timing device, according to some examples.

With further reference to FIGS. 31-33, the user interface and/or the display 216 may also be used to choose other settings (e.g., user identification, a defined profile, brightness of the display 216, a volume of the speaker 232, 332, language, etc.). Such as a stroke that will be swam during a timing sequence, a distance to be swam, etc. In addition, the timing device 10 may allow for various modes to be chosen. For example, the user may choose a simple mode (FIG. 32) and/or an advanced mode (FIG. 33). In a simple mode, a first set of data may be provided about the timing sequence. In some instances, the first set of data may include a reaction time, splits to various distances, and/or any other information. In the advanced mode, a second set of data may be provided about the timing sequence. For example, in the advanced mode, the display 216 may provide a graph of the velocity of the user during the timing sequence. As provided herein, the display 216 may illustrate multiple timing sequences on a common graph. The multiple timing sequences may be from a common person and/or different people. In some instances, the first set of data may be different from and/or have at least some overlap with the second set of data.

With further reference to FIGS. 28-33, a power source 136 is connected to the timing device 10. The power source 136 may be a battery that is storable within the timing device housing 58 and/or the timing device 10 may be electrically coupled to an external power supply (e.g., the grid). In examples that utilize a battery, the battery may be of any practicable type.

The timing device 10 may include a light source 94 and/or a speaker 232. The timing device 10 may also be equipped with one or more additional sensors 348 for detecting various actions of the user 54 and storing the detected data. Moreover, the user 54 of the timing device 10 may alternatively, or additionally, wear one or more additional sensors 348 for detecting their movement and/or any other desired information.

Further, the timing device 10 may further include an external button 350, which may be configured as an all-stop button, a reset button, and/or an off button. The external button 350 may be positioned along an outer surface of the timing device housing 58. When the external button 350 is compressed, if configured as an all-stop button, the external button 350 may halt any routines 130 of the timing device 10. In addition, the all-stop button 350 may place the spool 102 in a free spool condition. When the external button 350 is compressed, if configured as a reset button, one or more settings of the timing device 10 may return to a default, starting setting. When the external button 350 is compressed, if configured as an off button, various components of the timing device 10 may be turned off while others may remain powered.

Figure 34:
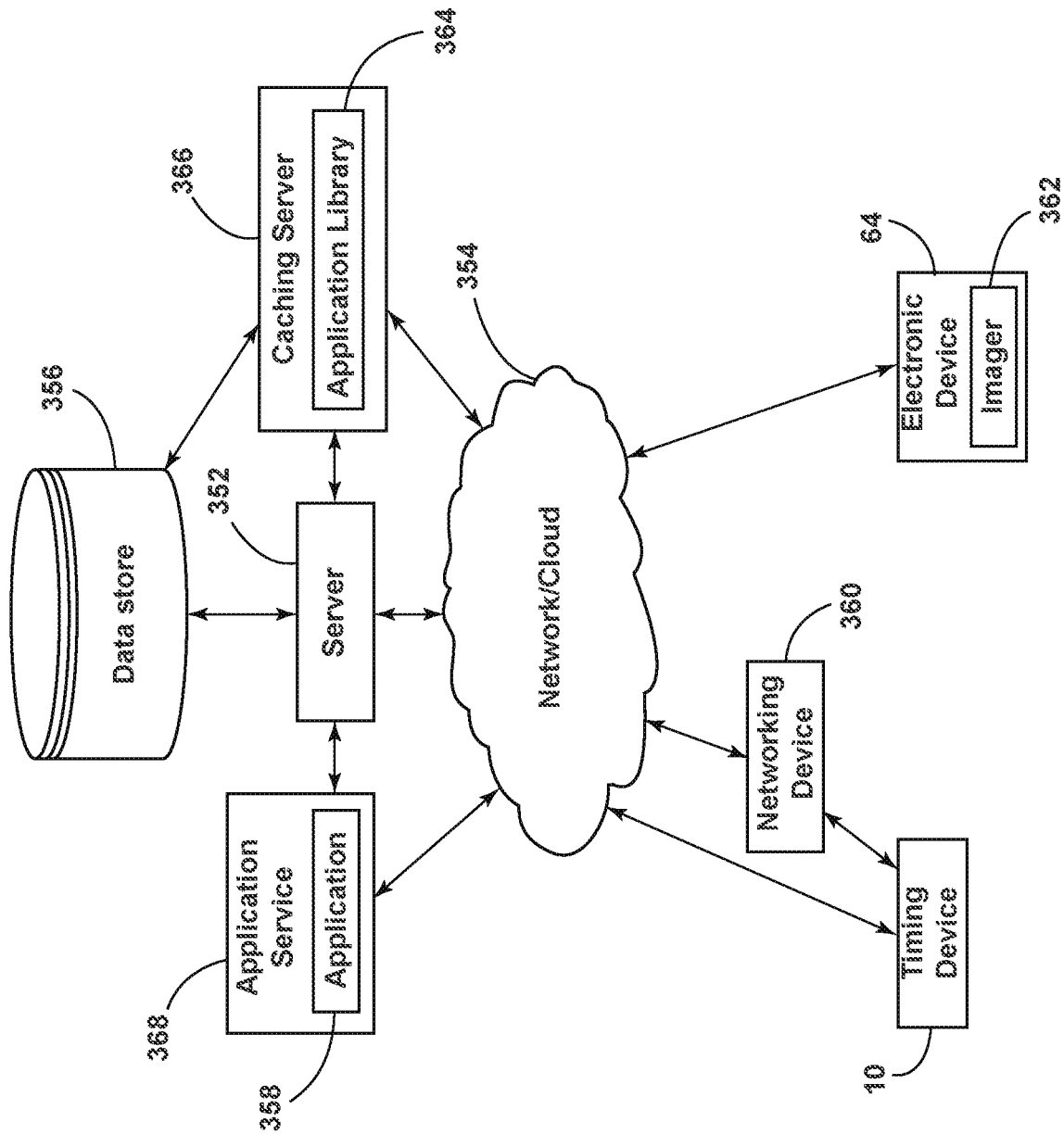
FIG. 34 is a block diagram of the timing device operably coupled with a remote server, according to some examples.

Referring to FIG. 34, in some examples, the timing device 10 may be communicatively coupled with one or more remote sites such as a remote server 352 via a network/cloud 354. The network/cloud 354 represents one or more systems by which the timing device 10 may communicate with the remote server 352. Accordingly, the network/cloud 354 may be one or more of various wired or wireless communication mechanisms, including any desired combination of wired and/or wireless communication mechanisms and any desired network topology (or topologies when multiple communication mechanisms are utilized). Exemplary communication networks cloud 354 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 354 in FIG. 34). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 354.

The server 352 may be one or more computer servers, each of which may include at least one processor and at least one memory, the memory storing instructions executable by the processor, including instructions for carrying out various steps and processes. The server 352 may include or be communicatively coupled to a data store 356 for storing collected data as well as instructions for operating timing device 10 (e.g., performing one or more sequences and/or routines 130) that may be directed to and/or implemented by the timing device 10 with or without intervention from a user and/or the electronic device 64.

In some examples, the instructions may be inputted through the electronic device 64 and relayed to the server 352. Those instructions may be stored in the server 352 and/or the data store 356. At various predefined periods and/or times, the timing device 10 may communicate with the server 352 through the network/cloud 354 to obtain the stored instructions, if any exist. Upon receiving the stored instructions, the timing device 10 may implement the instructions. The server 352 may additionally store information related to multiple timing devices 10, usage characteristics, errors, etc., and operate and/or provide instructions to the timing device 10 in conjunction with the stored information with or without intervention from a user and/or the electronic device 64.

With further reference to FIG. 34, the server 352 also generally implements features that may enable the timing device 10 to communicate with cloud-based applications 358. Communications from the timing device 10 can be directed through the network/cloud 354 to the server 352 and/or cloud-based applications 358 with or without a networking device 360, such as a router and/or modem. Additionally, communications from the cloud-based applications 358, even though these communications may indicate one of timing device 10 as an intended recipient, can also be directed to the server 352. The cloud-based applications 358 are generally any appropriate services or applications 358 that are accessible through any part of the network/cloud 354 and may be capable of interacting with the timing device 10.

In various examples, the electronic device 64 can be feature-rich with respect to communication capabilities, i.e. have built-in capabilities to access the network/cloud 354 and any of the cloud-based applications 358 or can be loaded with, or programmed to have such capabilities. The electronic device 64 can also access any part of the network/cloud 354 through industry-standard wired or wireless access points, cell phone cells, or network nodes. In some examples, users can register to use the remote server 352 through the electronic device 64, which may provide access the timing device 10 and/or thereby allow the server 352 to communicate directly or indirectly with the timing device 10. In various instances, the timing device 10 may also communicate directly, or indirectly, with the electronic device 64 or one of the cloud-based applications 358 in addition to communicating with or through the server 352. According to some examples, the timing device 10 can be preconfigured at the time of manufacture with a communication address (e.g. a URL, an IP address, etc.) for communicating with the server 352 and may or may not have the ability to upgrade or change or add to the preconfigured communication address.

Referring still to FIG. 34, when a new application 358 is developed and introduced, the server 352 can be upgraded to be able to receive communications for the new cloud-based application 358 and to translate communications between the new protocol and the protocol used by the timing device 10. The flexibility, scalability, and upgradeability of current server technology renders the task of adding new cloud-based application protocols to the server 352 relatively quick and easy.

With further reference to FIG. 34, in some examples, the timing device 10 and/or the electronic device 64 may receive and/or update applications thereon. For example, as provided herein, the timing device 10 and/or the electronic device 64 can include applications in the form of instructions that perform a variety of functions, such as various timing sequences. The applications can be downloaded to the timing device 10 and/or the electronic device 64 from an application service 368. The applications can be downloaded in response to a user selecting the applications from a collection of applications available through the application service 368. For instance, the application service can be an internet based application store from which a user can purchase, download, and install applications on the timing device 10 and/or the electronic device 64.

In some implementations, the timing device 10 and/or the electronic device 64 can download applications from an application library 364 hosted by a caching server 366. For example, the application library 364 can include applications previously purchased and/or downloaded to the caching server 366 by each timing device 10 and/or electronic device 64. The application library 364 can be a software application that maintains a repository of media (e.g., applications, data, etc.), for example. The user can select applications from the application library 364 to download to and install on the timing device 10 and/or the electronic device 64. Once the timing device 10 and/or the electronic device 64 has downloaded the selected applications, the timing device 10 and/or the electronic device 64 can install the applications on the timing device 10 and/or the electronic device 64.

In some implementations, the timing device 10 and/or the electronic device 64 can periodically query the application service 368 (or the application library 364) to determine if there are updates available for the applications installed on the timing device 10 and/or the electronic device 64. For example, the timing device 10 and/or the electronic device 64 can send application information, including application identifiers, version numbers, etc., for each application installed on the timing device 10 and/or the electronic device 64 to the application service 368. The application service 368 can compare the version number of an application installed on the timing device 10 and/or the electronic device 64 to the current version (e.g., latest version) of the application available to the application service 368. If a newer version (e.g., update) of the application is available, the application service 368 can transmit back to the timing device 10 and/or the electronic device 64 a list of applications that have updates available to download. For example, the application service 368 can transmit application names, identifiers, version numbers, etc., of updated applications to the timing device 10 and/or the electronic device 64.

In some cases, the application service 368 will track installed application version information received from the timing device 10 and/or the electronic device 64 and determine which versions of applications to retain at the application service 368 based on the installed application versions. For example, the application service 368 can maintain a repository of applications and application versions. The application service 368 can remove older versions of applications when the application version information received from the mobile devices indicates that the older application versions are no longer needed. For example, if an application in the repository has versions one through six (1-6), but the application version information received from the mobile devices indicates that the oldest version installed on any mobile device is version four (4), then the application service 368 can delete or remove versions 1-3 of the application from the application version repository. Thus, the application service 368 can more efficiently maintain the application service repository and make available storage capacity that can be used to store other applications or data.

In some examples, the timing device 10 and/or the electronic device 64 can be configured to automatically download application updates. For example, the timing device 10 and/or the electronic device 64 can automatically download and install the application updates identified by the application service 368. In some implementations, the timing device 10 and/or the electronic device 64 can be configured to prefer downloading application updates from the caching server 366. For example, the timing device 10 and/or the electronic device 64 can connect to the caching server 366 through the network/cloud 354.

With further reference to FIG. 34, in some examples, the electronic device 64 may include an imager 362 that is configured to detect or capture image data or other vision-based data (e.g., point cloud data) that is provided to the server 352 and/or the controller 62. In turn, one or more characteristics of the timing device 10 may be determined. For example, the one or more characteristics may be related to a distance between the timing device 10 and the starting location. With the distance detected, the controller 62 may determine various settings of the timing device 10. For example, the settings may relate to an initial distance $d_0$ and/or a final distance $d_F$ of the elongated member 50, a set of algorithms to evaluate the detected amount of time, etc. Additionally or alternatively, the imager 362 may be used to provide image data of a user 54 (FIG. 5) of the timing device 10 and/or the remote device.

The imager 362 may correspond to any suitable sensing device configured to detect or capture image data or other vision-based data (e.g., point cloud data). For example, in several embodiments, the imager 362 may correspond to a suitable camera configured to capture images of the field, such as three-dimensional images of the timing device 10 and/or the user within the associated field of view. For instance, in several embodiments, the imager 362 may correspond to a stereographic camera having two or more lenses with a separate image sensor for each lens to allow the camera to capture stereographic or three-dimensional images. However, in alternative embodiments, the imager 362 may correspond to Light Detection and Ranging (LIDAR) sensor or any other suitable vision-based sensing device.

In some instances, the methods and algorithms of the processor(s) 126 of the controller 62, the processor(s) of the electronic device 64, and/or the at least one processor of the server 352 can be implemented using a machine learning engine (MLE) that utilizes one or several machine learning techniques including, for example, decision tree learning, including, for example, random forest or conditional inference trees methods; neural networks; support vector machines; clustering; and Bayesian networks. These algorithms can include computer-executable code that can be retrieved by the memory 128 of the controller 62, the memory of the electronic device 64, and/or the remote server 352 and used to generate a predictive evaluation of the training device characteristics.

In various examples, the processor(s) of the controller 62, the processor(s) of the electronic device 64, the server 352, and/or an individual may classify training device characteristics of a timing device 10 based on various defined features. Each set of data can be manually analyzed to associate each real-world training device characteristics. That set of the data (the combination of real-world characteristics with inputted data) can then be utilized as a set of training data used to train an MLE to perform an automated evaluation to determine various information.

Figure 35:
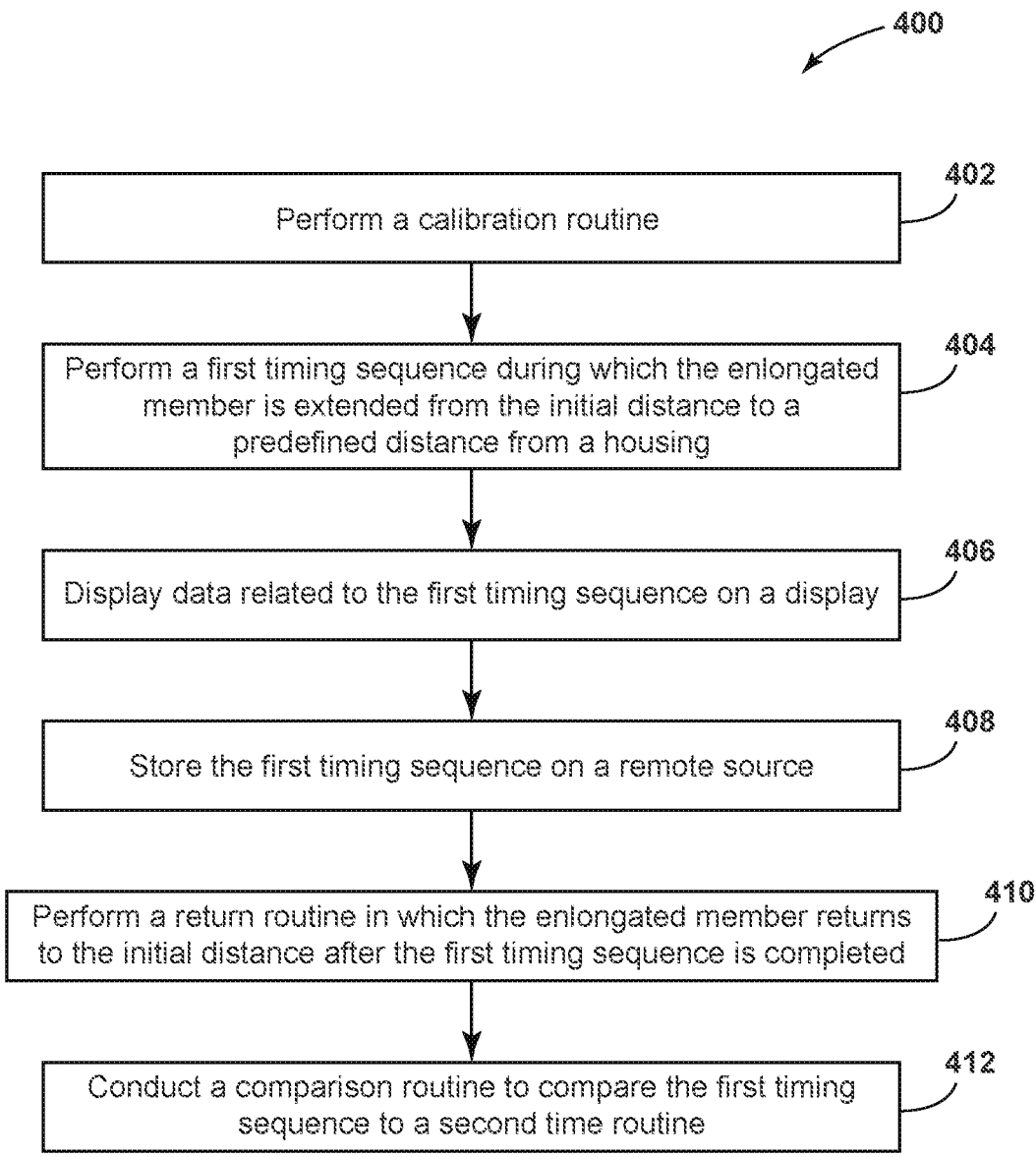
FIG. 35 is a method of operation the timing device, according to some examples.

Referring now to FIG. 35, a flow diagram of some examples of a method 400 of operating a timing device for swimming is illustrated in accordance with aspects of the present subject matter. In general, the method 400 will be described herein with reference to the timing device 10 described above with reference to FIGS. 1-34. However, it will be appreciated by those of ordinary skill in the art that the disclosed method 400 may generally be utilized with any suitable timing device and/or may be utilized in connection with a system having any other suitable configuration. In addition, although FIG. 35 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, the method 400, at step 402, can include performing a calibration routine to determine an initial distance that an elongated member extends from a housing. As provided herein, the calibration routine may be completed in order to calibrate a length of the elongated member extending an initial distance from the timing device.

The calibration routine may additionally or alternatively include determining a position of the timing device. As provided herein, the timing device may be positioned in various locations, such as on a stand. As such, the calibration routine may allow for the position of the timing device to be determined. The controller of the timing device may use the positional information of the timing device to update one or more timing sequences.

At step 404, the method 400 can include performing a first timing sequence during which the elongated member is extended from the initial distance to a predefined distance from a housing. During the timing sequence, data may be collected from an encoder to determine the acceleration of a user 54, instantaneous velocity of the user 54, time to complete the predefined distance $d_F$, a reaction time, a distance jumped, splits at predefined distances, distances covered during predefined time intervals, a maximum velocity, a minimum velocity, an average velocity, a maximum acceleration/deceleration, a minimum acceleration/deceleration, an average acceleration/deceleration, a maximum jerk, a minimum jerk, an average jerk, a maximum power, a minimum power, an average power, and/or any other data.

At step 406, the method 400 can include displaying data related to the first timing sequence on a display. As provided herein, the display may be operably coupled with the timing device, the electronic device, and/or any other device.

At step 408, the method 400 can include storing the first timing sequence on a remote site. The one or more remote sites may include a remote server that is accessible through a network/cloud, a transceiver, an interface, and/or through any other device.

At step 410, the method 400 can include performing a return routine in which the elongated member returns to the initial distance after the first timing sequence is completed. As provided herein, the calibration sequence may be completed with the elongated member extending an initial distance from the timing device housing. In operation, the return routine may rewind the elongated member about the spool until the elongated member extends the initial distance from the timing device housing with the initial distance being defined by the calibration routine.

At step 412, the method 400 can include conducting a comparison routine to compare the first timing sequence to a second time routine. For example, the comparison routine may compare a just completed timing sequence to the user's other repetitions during a common training session, the user's repetitions during another training session, and/or to other users of the training device.

In various examples, the method 400 may implement machine learning methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Use of the present disclosure may offer a variety of advantages. For instance, use of the timing device provides more accurate and constant data of a user's performance. The data is continually updated at the pulse rate of the encoder. The timing device may also provide a transportable device that may be used in various environments where current timing devices are ineffective, such as within a pool. Moreover, the timing device may prevent water from contacting non-water resistant electrical components within the timing device by separating the housing into more than one portion. The timing device may include any or all of the features provided herein and still is manufactured at low costs when compared to standard timing assemblies.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the device being modified) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A timing device for swimming, comprising:
a housing defining an aperture;
an elongated member extendable from the housing through the aperture;
a reel assembly including a spool rotatable about a spool axle, wherein a portion of the elongated member is wound about the spool;
an encoder assembly including a first wheel and an encoder operably coupled with the first wheel, the encoder configured to detect a rotational velocity of the first wheel; and
a controller configured to calculate a linear velocity of the elongated member based on the rotational velocity of the first wheel, wherein the elongated member is configured to move with a swimmer as the swimmer moves away from the housing.

2. The timing device of claim 1, wherein the housing defines a body and a lid, and wherein the body defines a compartment.

3. The timing device of claim 2, wherein the compartment defines a first portion at least partially defined by the body and a divider and a second portion at least partially defined by the body and the divider, the first portion of the compartment positioned on an opposing side of the divider from the second portion.

4. The timing device of claim 3, further comprising:
a panel position between the lid and the divider.

5. The timing device of claim 4, wherein the panel supports one or more input devices.

6. The timing device of claim 1, further comprising:
a panel positioned above the encoder assembly in a Z-direction, the panel supporting a display.

7. The timing device of claim 6, wherein the display includes a touch input circuitry to receive an input corresponding with a location over the display.

8. The timing device of claim 6, further comprising:
a frame positioned along a peripheral portion of the display on a first side of the panel; and
a casing positioned on an opposing side of the panel from the frame and at least partially encapsulating a portion of the display between the casing and the panel.

9. The timing device of claim 1, wherein the reel assembly further comprises:
an actuator operably coupled with a clutch, the actuator and the clutch configured to disengage a winding assembly from the reel upon initiation of a clock.

10. The timing device of claim 1, further comprising:
one or more wireless communication transceivers operably coupled to the controller and configured to interact with an electronic device.

11. A timing device, comprising:
a housing defining a body and a lid, wherein the body defines a compartment;
a reel assembly configured to operably couple with an elongated member;
an encoder assembly including a first wheel, a second wheel, and an encoder operably coupled with at least one of the first wheel or the second wheel, wherein the first wheel rotates in a first direction and the second wheel rotates in a second direction; and
a display operably coupled with the housing.

12. The timing device of claim 11, further comprising:
an encoder housing operably supporting the first wheel, the second wheel, and the encoder, the encoder housing defining an inlet and an outlet.

13. The timing device of claim 12, wherein the inlet is vertically offset from the outlet in a Z-direction.

14. The timing device of claim 12, wherein the inlet is upstream of the first wheel and the second wheel relative to an extension path of the elongated member and the outlet is downstream of the first wheel and the second wheel relative to the extension path of the elongated member.

15. The timing device of claim 11, further comprising:
a third wheel downstream of the first and second wheels along an extension path of the elongated member; and
a guide positioned between the second wheel and the third wheel in a Y-direction.

16. A timing device for swimming, comprising:
a housing defining an aperture;
an elongated member extendable from the housing through the aperture;
a reel assembly including a spool rotatable about a spool axle, wherein a portion of the elongated member is wound about the spool;
an encoder assembly including a first wheel and an encoder operably coupled with the first wheel, the encoder configured to detect a rotational velocity of the first wheel; and
an actuator operably coupled with a clutch, the actuator and the clutch configured to disengage a winding assembly from the reel upon initiation of a clock.

17. The timing device for swimming of claim 16, further comprising:
a controller configured to calculate a linear velocity of the elongated member based on the rotational velocity of the first wheel, wherein the elongated member is configured to move with a swimmer as the swimmer moves away from the housing.

18. The timing device for swimming of claim 16, wherein the housing defines a body and a lid, and wherein the body defines a compartment.

19. The timing device of claim 18, further comprising:
a panel position between the lid and the divider.

20. The timing device of claim 16, further comprising:
a display operably coupled with the housing.

* * * * *